(12) United States Patent
Ronning et al.

(10) Patent No.: US 9,166,259 B2
(45) Date of Patent: Oct. 20, 2015

(54) BATTERY COOLING APPARATUS FOR ELECTRIC VEHICLE

(71) Applicants: Jeffrey J. Ronning, Noblesville, IN (US); Ross K. Brown, Anderson, IN (US)

(72) Inventors: Jeffrey J. Ronning, Noblesville, IN (US); Ross K. Brown, Anderson, IN (US)

(73) Assignee: United Fleet Financing LLC, Scottsdale, AZ (US)

( * ) Notice: Subject to any disclaimer, the term of this patent is extended or adjusted under 35 U.S.C. 154(b) by 220 days.

(21) Appl. No.: 14/052,787

(22) Filed: Oct. 14, 2013

(65) Prior Publication Data

US 2014/0038010 A1    Feb. 6, 2014

Related U.S. Application Data

(63) Continuation of application No. 13/596,589, filed on Aug. 28, 2012, now Pat. No. 8,557,425, which is a continuation of application No. 12/569,987, filed on Sep. 30, 2009, now Pat. No. 8,268,472.

(51) Int. Cl.

| H01M 10/60 | (2014.01) |
|---|---|
| H01M 10/6563 | (2014.01) |
| H01M 10/647 | (2014.01) |
| H01M 10/6551 | (2014.01) |
| H01M 10/617 | (2014.01) |
| H01M 10/6561 | (2014.01) |

(52) U.S. Cl.
CPC ........ *H01M 10/5067* (2013.01); *H01M 10/617* (2015.04); *H01M 10/647* (2015.04); *H01M 10/6551* (2015.04); *H01M 10/6561* (2015.04); *H01M 10/6563* (2015.04)

(58) Field of Classification Search
CPC ... H01M 10/60; H01M 10/61; H01M 10/613; H01M 10/615; H01M 10/617; H01M 10/62; H01M 10/623; H01M 10/6235; H01M 10/625; H01M 10/627; H01M 10/65; H01M 10/655; H01M 10/6554; H01M 10/6555; H01M 10/6561; H01M 10/6562; H01M 10/647
See application file for complete search history.

(56) References Cited

U.S. PATENT DOCUMENTS

| 3,563,805 A | 2/1971 | Deierhoi, Jr. |
|---|---|---|
| 3,630,782 A | 12/1971 | Butler |
| 5,015,545 A | 5/1991 | Brooks |
| 5,049,457 A | 9/1991 | Niksa et al. |
| 5,378,555 A | 1/1995 | Waters et al. |
| 5,424,143 A | 6/1995 | Shrim |
| 5,501,918 A | 3/1996 | Gruenstern et al. |

(Continued)

OTHER PUBLICATIONS

"01/ePLB-Cell", EiG, Copyright 2007, 2 pages.

(Continued)

*Primary Examiner* — Carlos Barcena
(74) *Attorney, Agent, or Firm* — Barnes & Thornburg LLP

(57) ABSTRACT

A battery pack apparatus has a plurality of battery cell units that are stacked together in generally parallel relation. The battery cell units are configured to define converging air flow spaces therebetween. An air inlet header provides a converging air inlet plenum that is situated adjacent one side of the battery cell units and an air outlet header provides a diverging air outlet plenum that is situated adjacent an opposite side of the battery cell units. A blower or fan forces air into the air inlet plenum. The air flows through the air flow spaces between the battery cell units to cool the battery cell units. The speed of the air increases as it advances through the air inlet plenum and the plurality of air flow spaces.

12 Claims, 19 Drawing Sheets

(56) References Cited

U.S. PATENT DOCUMENTS

| | | | |
|---|---|---|---|
| 5,589,290 | A | 12/1996 | Klink et al. |
| 5,639,571 | A | 6/1997 | Waters et al. |
| 5,958,618 | A | 9/1999 | Sullivan |
| 6,190,793 | B1 | 2/2001 | Barton et al. |
| 6,225,778 | B1 | 5/2001 | Hayama et al. |
| 6,344,728 | B1 | 2/2002 | Kouzu et al. |
| 6,368,743 | B1 | 4/2002 | Guerin et al. |
| 6,411,063 | B1 | 6/2002 | Kouzu et al. |
| 6,482,542 | B1 | 11/2002 | Takaki et al. |
| 6,709,783 | B2 | 3/2004 | Ogata et al. |
| 6,761,992 | B1 | 7/2004 | Marukawa et al. |
| 6,821,671 | B2 | 11/2004 | Hinton et al. |
| 6,948,078 | B2 | 9/2005 | Odaohhara |
| 7,150,935 | B2 | 12/2006 | Hamada et al. |
| 7,399,551 | B2 | 7/2008 | Yagi et al. |
| 7,531,270 | B2 | 5/2009 | Buck et al. |
| 7,541,770 | B2 | 6/2009 | Kim et al. |
| 7,560,190 | B2 | 7/2009 | Ahn et al. |
| 7,618,740 | B2 | 11/2009 | Hamada et al. |
| 7,635,040 | B2 | 12/2009 | Seo et al. |
| 7,642,004 | B2 | 1/2010 | Shimoyama |
| 7,654,351 | B2 | 2/2010 | Koike et al. |
| 7,658,083 | B2 | 2/2010 | Zhu et al. |
| 7,682,732 | B2 | 3/2010 | Kim et al. |
| 8,268,472 | B2 | 9/2012 | Ronning et al. |
| 8,557,425 | B2 | 10/2013 | Ronning et al. |
| 2003/0211384 | A1 | 11/2003 | Hamada et al. |
| 2004/0207368 | A1 | 10/2004 | Kimoto et al. |
| 2005/0123828 | A1 | 6/2005 | Oogami et al. |
| 2005/0202311 | A1 | 9/2005 | Higashino et al. |
| 2006/0202661 | A1* | 9/2006 | Kim et al. ............ 320/116 |
| 2007/0015049 | A1 | 1/2007 | Hamada et al. |
| 2007/0285051 | A1* | 12/2007 | Jeon et al. ............ 320/112 |
| 2008/0124617 | A1 | 5/2008 | Bjork |
| 2009/0111010 | A1 | 4/2009 | Okada et al. |
| 2009/0120620 | A1 | 5/2009 | Abe et al. |
| 2009/0258289 | A1 | 10/2009 | Weber et al. |
| 2009/0325052 | A1 | 12/2009 | Koetting et al. |
| 2009/0325053 | A1* | 12/2009 | Koetting et al. ............ 429/120 |
| 2009/0325055 | A1 | 12/2009 | Koetting et al. |
| 2011/0076540 | A1 | 3/2011 | Ronning et al. |

OTHER PUBLICATIONS

"02/ePLB-Module": EiG, Copyright 2007, 2 pages.

* cited by examiner

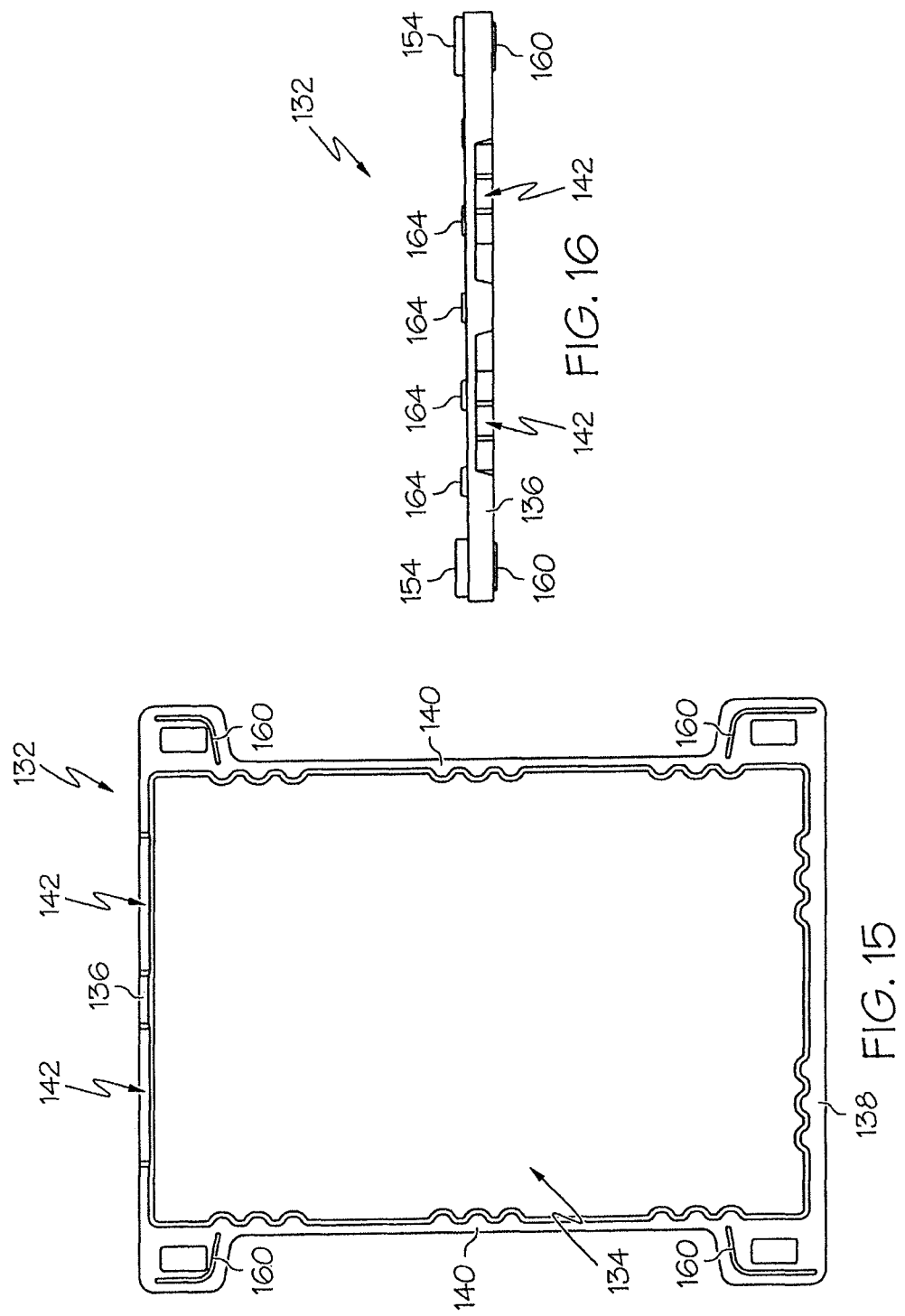

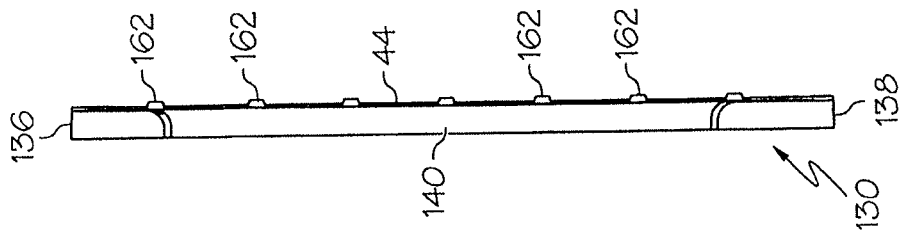
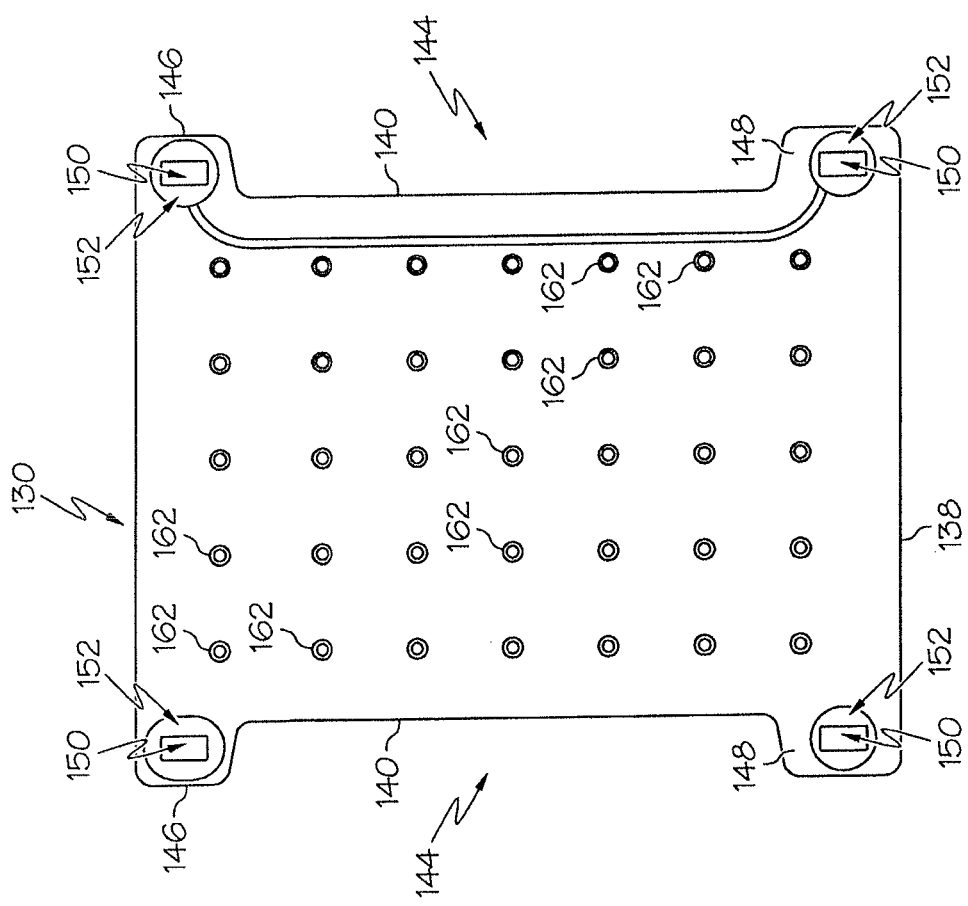

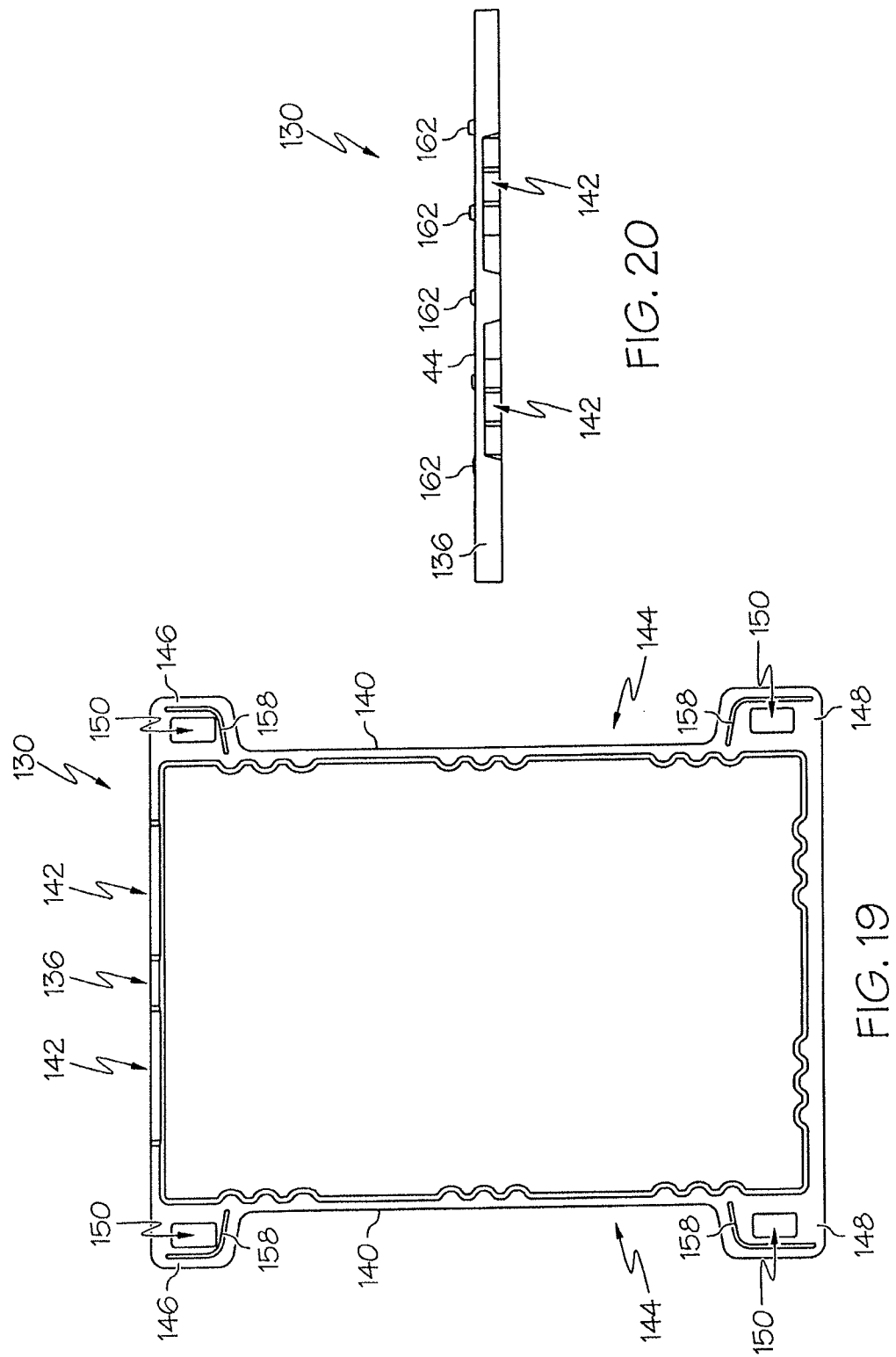

US 9,166,259 B2

BATTERY COOLING APPARATUS FOR ELECTRIC VEHICLE

This application is a continuation of U.S. application Ser. No. 13/596,589, filed Aug. 28, 2012, which is a continuation of U.S. application Ser. No. 12/569,987, filed Sep. 30, 2009, now U.S. Pat. No. 8,268,472 and each of which is hereby expressly incorporated by reference herein.

BACKGROUND

The present disclosure relates to battery packs for automotive vehicles. More particularly, the present disclosure relates to battery cooling apparatus using air to cool battery packs having at least one stacked array of rechargeable battery cells.

Electric vehicles, including hybrid electric vehicles, have electric motors for propelling the vehicles along roadways, for example, and these electric motors typically rely upon onboard rechargeable batteries as their energy source. Battery packs having a fairly large number of individual rechargeable battery cells are frequently used with such vehicles. An example of a battery cell that is used in electric vehicles is a lithium ion battery cell. When recharging and when discharging to provide power to the electric motors of electric vehicles, the battery cells generate heat that needs to be removed in order to maintain the battery cells below their maximum allowable temperatures so that the battery cells are not damaged or destroyed by the heat. When removing heat from battery packs, it is desirable but not necessary to have the faces of each of the battery cells maintained at a fairly uniform temperature.

Some electric vehicles may use liquid cooling systems to cool their battery packs. For example, liquid cooling systems using approximately 50% ethylene glycol or other similar cooling fluids in water have been developed. The cooling fluid is pumped or otherwise moved passed the battery cells to remove the heat from the cells. The benefit of liquid cooling systems is that the volumetric heat capacity of the liquid allows tight control of temperature uniformity. However, liquid cooling systems are heavy, costly, take up a lot of space, and are prone to developing fluid leaks, especially if they employ numerous fluid connections.

Using air to cool battery packs, rather than liquid, introduces a host of other concerns. Any cooling media possesses a finite thermal heat capacity per unit of mass and will increase in temperature as it passes by the surface of the heat-generating item to be cooled, such as a battery cell. Air is a low-density cooling medium and can experience high temperature gradients as it passes along a surface to be cooled if there is a poor ratio of air flow to heat absorption. In typical battery pack cooling systems in which air is used as the cooling media, near the inlet, the temperature of the battery cell face is approximately equal to the inlet air temperature and near the outlet, the temperature of the battery cell face is approximately equal to the outlet air temperature. An example of a known air cooling system for a battery pack is shown and described in U.S. Pat. No. 5,015,545. Often with these conventional air cooling designs, the air temperature increases across the face of the battery cell by more than the preferred 3° Celsius for a lithium ion battery, for example. Accordingly, there is a need for an improved air cooled battery pack apparatus.

SUMMARY

A battery pack apparatus for an automotive vehicle is provided and comprises one or more of the features recited in the appended claims and/or the following features which, alone or in any combination, may comprise patentable subject matter:

A battery pack apparatus according to this disclosure may have a plurality of battery cells and a plurality of cell coverings. The battery cells may be generally flat battery cells. Each cell covering may have an internal space that receives at least one battery cell. Each of the cell coverings may have external first and second planar faces that face away from the at least one battery cell received in the respective internal space. The plurality of cell coverings may be arranged such that the first planar face of each cell covering faces the second planar face of an adjacent one of the plurality of cell coverings. The first and second planar faces may be spaced apart from one another. Each cell covering and the at least one battery cell contained in the internal space of the cell covering may be referred to as a battery cell unit.

Each of the cell coverings may be constructed such that the first and second planar faces of adjacent cell coverings define a converging air flow space. Thus, the battery pack apparatus may have a plurality of generally parallel converging air flow spaces that are defined between the cell coverings. Each of the converging air flow spaces may be wider at an air inlet end of the air flow space and narrower at an air outlet end of the air flow space.

Each of the cell coverings may have a plurality of standoffs extending from the first and second planar faces to maintain proper spacing between adjacent pairs of cell coverings. In one embodiment, the standoffs extending from the first planar face of each cell covering may comprise a plurality of pedestals and the standoffs extending from the second planar face of each cell covering comprises a plurality of pedestal receivers. The pedestals may have generally cylindrical portions and the pedestal receivers may comprise annular rings that receive the generally cylindrical portions of the pedestals. The pedestals and pedestal receivers may be arranged to form a grid pattern on the respective first and second planar faces. Rows of the grid defined by the pedestals and pedestal receivers may be substantially parallel with the top and bottom ends of the battery cell units or may be skewed into an orientation that is inclined with respect to the top and bottom ends of the battery cell units. The standoffs may comprise ribs that may be elongated and extend along the planar faces of the cell coverings in a direction generally parallel to the direction of air flow.

Each of the cell coverings may include a tray-like first shell half and a tray-like second shell half. The first and second shell halves may be shaped to define the internal space therebetween and may mate together along a peripheral seam that extends around the top, bottom and sides of the cell covering. The internal space may receive at least one battery cell therein. Each of the cell coverings may have first and second sidewalls interconnecting the first and second planar faces. The first and second sidewalls may have recesses formed therein to define a pair of upper ears situated above the recesses in the first and second sidewalls and a pair of lower ears situated below the recesses in the first and second sidewalls.

Each of the upper ears and lower ears may have an aperture therethrough. The battery pack apparatus may include a set of coupling bars that extend through the apertures in the pair of upper ears and pair of lower ears. According to this disclosure, each of the apertures may be rectangular in shape and each coupling rod may have a rectangular cross section. The battery pack apparatus may further include a first end plate and a second end plate. Each of the coupling bars may having a first end fastened to the first end plate and a second end fastened to the second end plate. Thus, as contemplated by this disclosure, the plurality of cell coverings and the plurality of battery cells may be sandwiched between the first and second end plates of the battery pack apparatus. The coupling bars may hold the cell coverings and battery cells in place thereby forming a stacked array of battery cell units.

The upper and lower ears may each have a protrusion on one side thereof and a depression on an opposite side thereof. The protrusions of the upper and lower ears of each cell covering may nest within the depressions of the upper and lower ears of a next adjacent cell covering. Some of the depressions and protrusions may be round in cross section and at least one of the depressions and a least one of the protrusions may be non-round in cross section. Such a configuration prevents the cell coverings from being stacked in an improper orientation.

In one embodiment, the internal space of each cell covering receives two battery cells. A top of each cell covering may have a first opening and a second opening. The openings may be formed by notches provided at the top of the cell coverings along the peripheral seam of the associated of first and second tray halves. Each of the pair of battery cells received in the internal space of each cell covering may have a positive terminal tab that extends through the first opening of the respective cell covering and may have a negative terminal tab that extends through the second opening of the respective cell covering.

The battery pack apparatus may also have a top plate assembly that is situated atop all of the cell coverings. The top plate assembly may have a first row of openings through which respective pairs of the positive terminal tabs extend and may have a second row of openings through which respective pairs of the negative terminal tabs extend. The top plate may be configured to electrically interconnect all of the battery cells to a main positive stud and to a main negative stud. In one embodiment, the positive terminal tabs of the two battery cells received in the internal space of each of each of the cell coverings are coupled together and the negative tabs of the two battery cells received in the internal space of each of the cell coverings are coupled to together. In such an arrangement, the pair of battery cells in each internal space of each cell covering are electrically coupled together in parallel. Also in this embodiment, the parallel pairs of battery cells are electrically connected in series between the main positive terminal stud and the main negative terminal stud.

Thus, with the exception of the pair of battery cells having their negative terminal tabs coupled to the negative main terminal stud with no intervening battery cells therebetween and the pair of battery cells having their positive terminal tabs coupled to the positive main terminal stud with no intervening batter cells therebetween, the positive terminal tabs of the pairs of each of the battery cells are coupled electrically to the pair of negative terminal tabs of the next adjacent battery cell and vice versa. The top plate assembly may have conductive brackets which electrically couple the positive and negative terminals tabs of adjacent pairs of battery cells together.

According to this disclosure, the battery pack apparatus may further include a blower, an air inlet header situated adjacent a first side of the cell coverings, and an air outlet header situated adjacent a second side of the cell coverings. The air inlet header may be shaped to define a converging air inlet plenum that narrows in the direction of air flow produced by the blower. That is, the air inlet plenum may narrow or converge in the downstream direction. The air outlet header may be shaped to define a diverging air outlet plenum that widens in the direction of air flow out of the air outlet header. That is, the air outlet plenum may widen or diverge in the downstream direction. The air inlet ends of the converging air flow spaces between the cell coverings may be in air flow communication with the converging air inlet plenum and the air outlet ends of the converging air flow spaces between the cell covering may be in air flow communication with the diverging air outlet plenum.

The battery pack apparatus may have a controller operable to adjust a speed at which the blower operates and at least one temperature sensor located on, within, or adjacent at least one of the cell coverings. Thus, the speed of the blower may be adjusted by the controller in response to a signal from the at least one temperature sensor. The at least one temperature sensor may comprise, for example, a first thermistor located on the cell covering adjacent one end of the battery pack apparatus, a second thermistor located on the cell covering adjacent an opposite end of the battery pack apparatus, and a third thermistor located on the cell covering that is situated about midway between the cell coverings adjacent the ends of the battery pack apparatus. In such an arrangement, the speed of the blower may be adjusted based on an average of the signals from the first, second, and third thermistors.

According to an aspect of this disclosure, a battery pack apparatus may comprise a plurality of generally flat battery cells and a plurality of cell coverings with each cell covering being sized to contain two battery cells. The cell coverings each may have a first planar face and a second planar face. The plurality of cell coverings may be arranged such that the first planar face of each cell covering faces the second planar face of an adjacent one of the plurality of cell coverings and is spaced therefrom. In this arrangement of the cell coverings, a plurality of generally parallel air flow spaces are defined between the plurality of cell coverings.

According to another aspect of this disclosure, a battery pack apparatus may comprise a plurality of generally flat battery cells and a plurality of heat transfer jackets. Each heat transfer jacket may encase at least one of the plurality of battery cells. The plurality of heat transfer jackets may be arranged in spaced apart face-to-face relation and may be configured such that a plurality of generally parallel converging air flow spaces are defined between the spaced apart faces of adjacent heat transfer jackets. The battery pack apparatus may also have a blower, an air inlet duct covering a first side of the plurality of heat transfer jackets, and an air outlet duct covering a second side of the plurality of heat transfer jackets. The air inlet duct may be shaped to define a converging air inlet plenum that becomes narrower in a direction from a first end of the battery pack apparatus toward a second end of the battery pack apparatus. In contrast, the air outlet duct may be shaped to define a diverging air outlet plenum that becomes wider in a direction from the first end of the battery pack apparatus toward the second end of the battery pack apparatus. Each of the air flow spaces defined between the heat transfer jackets may be in air flow communication with the first and second plenums.

An apparatus according to the present disclosure may include a battery cooling system for a battery pack of an electric vehicle, such as a hybrid electric vehicle, that uses air as the cooling medium but yet is designed to maintain the temperature of each battery cell more uniform along the surface of the battery cell than is believed to have been achieved in prior art systems. A feedback control system with one or more temperature sensors that provide signals which are processed by a control circuit or controller to determine whether to adjust the speed at which a blower of the system operates may be included in such an apparatus.

Further according to this disclosure, a leading edge of each of the cell coverings may be covered by a respective insulator, such as foam tape for example, in the region of the cell coverings near the air inlet ends of the converging air flow spaces. The regions of the first and second planar faces near the leading edges of each of the cell coverings may be recessed to accommodate respective portions of the insulator. Thus, each of the insulators may wrap around the lead edges of the respective cell coverings. The presence of the insulator may minimize a thermal fin effect at the leading edge of the cell coverings which would otherwise have a tendency to generate cool spots in the battery cells within the cell coverings near the leading edges of the battery cell units.

Additional features, which alone or in combination with any other feature(s), such as those listed above and those listed in the appended claims, may comprise patentable subject matter and will become apparent to those skilled in the art upon consideration of the following detailed description of illustrative embodiments exemplifying the best mode of carrying out the embodiments as presently perceived.

BRIEF DESCRIPTION OF THE DRAWINGS

The detailed description particularly refers to the accompanying figures, in which:

FIG. 15 is a rear elevation view of the tray-like shell half of FIGS. 13 and 14;

FIG. 16 is top plan view of the tray-like shell half of FIGS. 13-15;

FIG. 17 is a front elevation view of the other of the tray-like shell halves showing a plurality of circular pedestals or posts arranged in a grid pattern on a front face of the shell half and showing a recess in each of the sides of the shell half such that a pair of upper ears are provided above the recesses and a pair of lowers ears are provided below the recesses, each upper and lower ear having a rectangular aperture that is sized to receive a respective one of the four coupling bars;

FIG. 18 is a side elevation view of the tray-like shell half of FIG. 17;

FIG. 19 is a rear elevation view of the tray-like shell half of FIGS. 17 and 18;

FIG. 20 is top plan view of the tray-like shell half of FIGS. 17-19;

DETAILED DESCRIPTION

Figure 1:
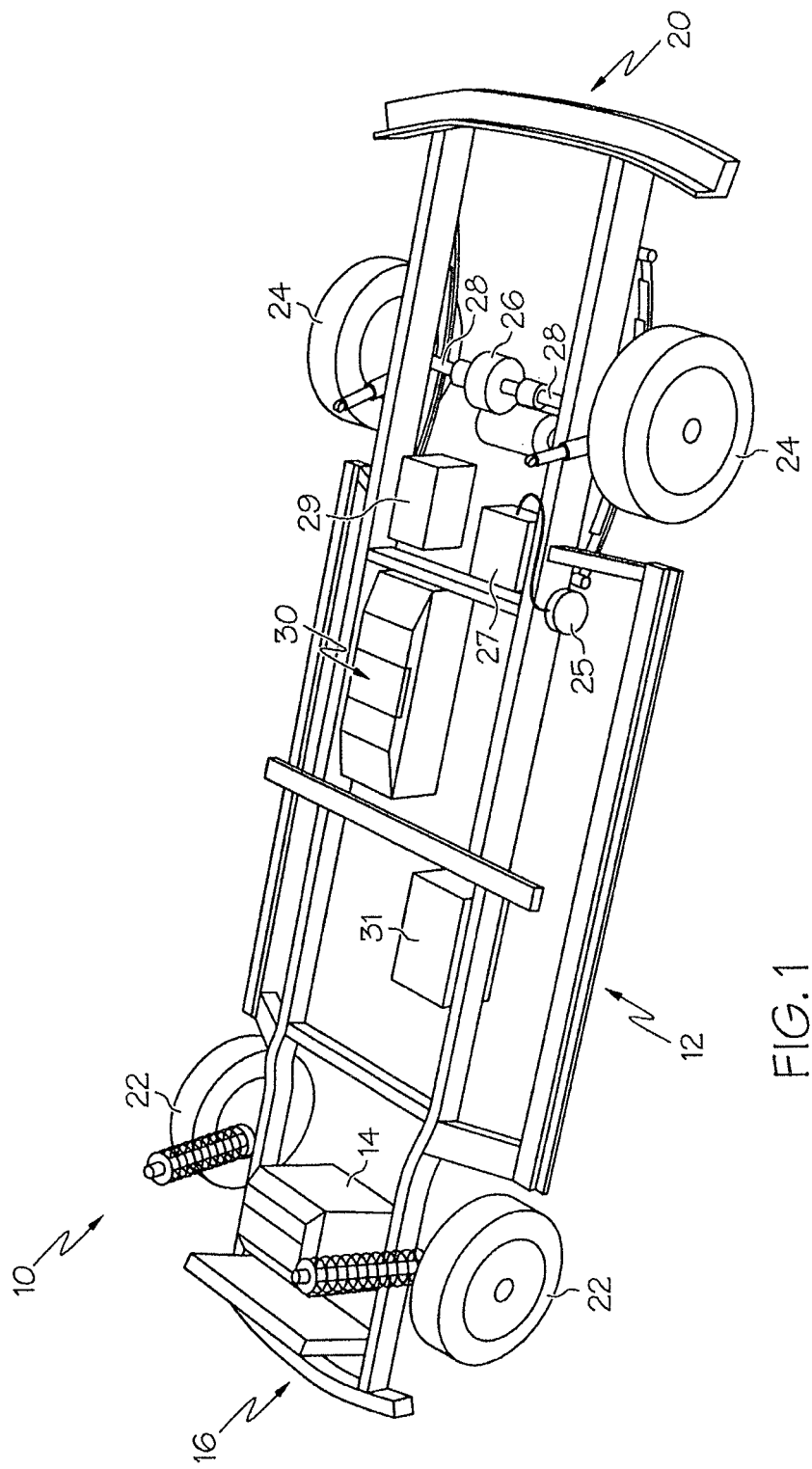
FIG. 1 is a perspective view of a portion of a hybrid electric vehicle showing a lower chassis of the vehicle, an internal combustion engine located at a front region of the lower chassis, an electric motor located at a rear region of the chassis and coupled to the rear wheels, and a battery pack located at a middle region of the lower chassis.

A portion of an automotive vehicle 10 is shown in FIG. 1 and includes a lower chassis 12, an internal combustion engine 14 located at a front region 16 of the lower chassis 12, and an electric motor 18 located at a rear region 20 of the chassis 12. Engine 14 is coupled to front wheels 22 of vehicle 10 via a conventional transmission system (not shown) and/or transaxle system (not shown) as is well known in the art to propel the front wheels 22. In the illustrative example, the electric motor is coupled to the rear wheels 24 via a gear reducer or transmission assembly 26 and axle arrangement 28. A battery pack apparatus 30 (sometimes referred to herein as just a "battery pack") is located at a middle region of the lower chassis 12 in the illustrative embodiment as shown in FIG. 1. In other embodiments contemplated herein, battery pack 30 is mounted elsewhere in the vehicle, such as at the front region 16 or rear region 20 to chassis 12.

Vehicle 10 has a recharging receptacle 25 which is coupleable to an external power source (not shown) to recharge battery pack 30. A battery management system controller 27 is coupled to recharging receptacle 24 and contains the circuitry that controls the recharging of battery pack 30 as well as controlling the operation of a battery cooling system as discussed in further detail below in connection with FIG. 21. Vehicle 10 also has a hybrid system controller 29 which contains the electrical circuitry that controls the operation of engine 14 and electric motor 18. A gas tank 31 is provided for storing gasoline used to power the internal combustion engine 14.

Figure 2:
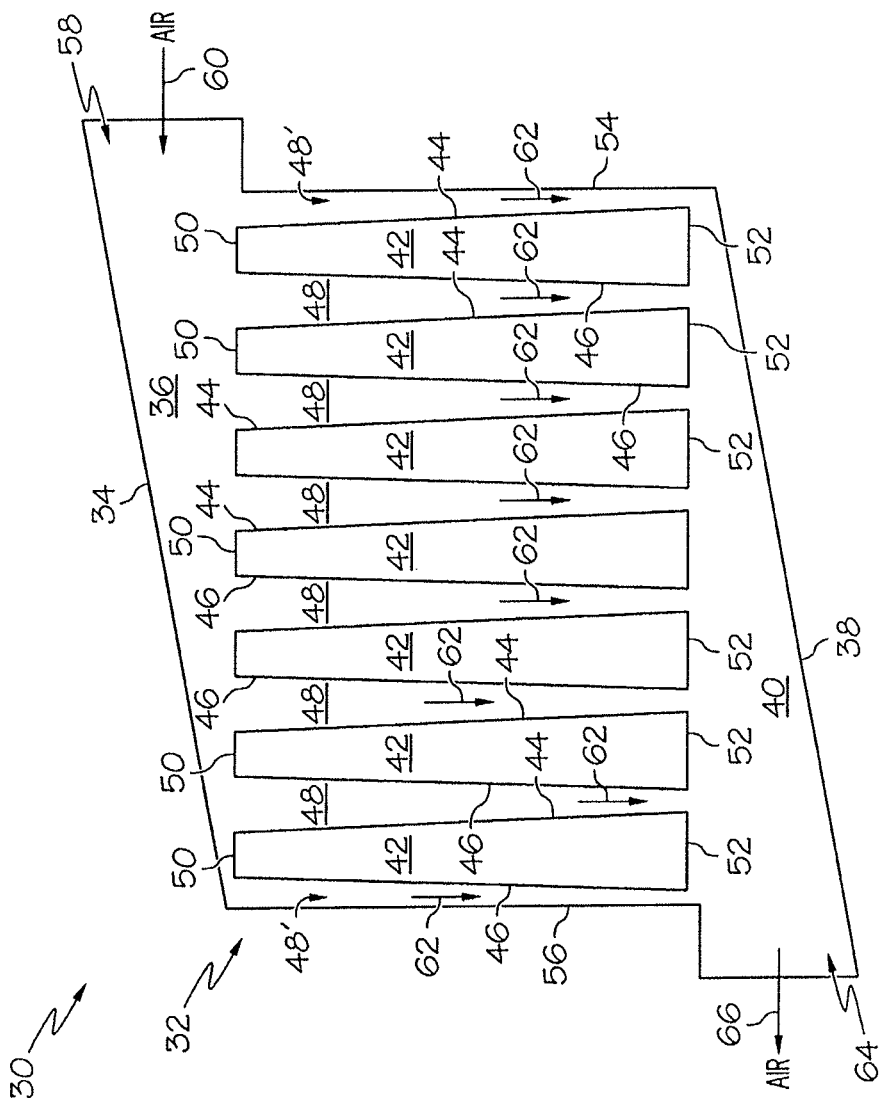
FIG. 2 is a cross sectional diagrammatic view showing a battery pack apparatus having a housing shaped to define a converging air inlet plenum and a diverging air outlet plenum, the battery pack apparatus having a plurality of battery cell units situated between the air inlet plenum and the air outlet plenum, each of the battery cell units having angled planar faces, and the battery cell units being oriented in generally parallel spaced apart relation in the housing such that a plurality of converging air flow spaces are defined between the angled planar faces of adjacent battery cell units.
Figure 21:
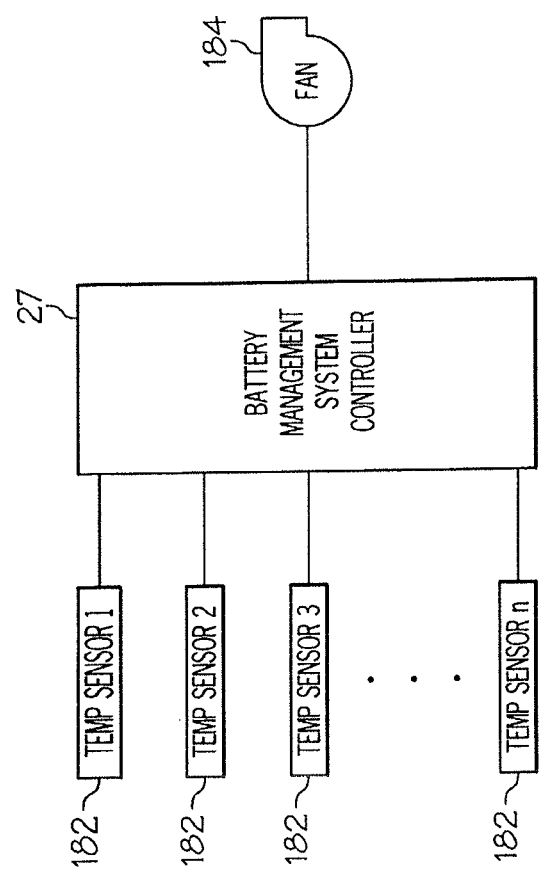
FIG. 21 is a diagrammatic view of an air flow control system of the battery pack apparatus, the air flow control system having a plurality of temperature sensors that, in use, are mounted to respective battery cell cassettes, a battery management system having circuitry that receives signals from each of the temperature sensors, and an adjustable speed fan which the battery management controls based on the signals received from the temperature sensors.

The present disclosure is focused primarily on aspects of battery pack 30 and particularly, is focused on aspects of convectively cooling battery pack 30 with air. Thus, the details of vehicle 10 provided in connection with FIG. 1 are provided only for general background information and to provide a general understanding of the environment in which illustrative battery pack 30 may be used. FIGS. 2 and 3 illustrate diagrammatically the basic concept of convective air cooling employed in contemplated embodiments and FIGS. 4-20 show the details of an illustrative embodiment and its various components. FIG. 21 is a block diagram of an electrical control system associated with the battery pack. Additional details of vehicle 10 can be found in U.S. application Ser. No. 12/271,194 filed Nov. 14, 2008, U.S. Provisional App. No. 61/214,240 filed Apr. 21, 2009, and U.S. Design App. No. 29/335,696 filed Apr. 20, 2009, each of which is hereby incorporated by reference herein. Vehicle 10 may be, for example, the Bright Automotive IDEA vehicle.

In the illustrative example, battery pack 30 is shown being used in connection with a parallel, road-coupled, plug-in hybrid electric vehicle. However, it should be understood that battery pack 30 according to this disclosure can be used with other types of electric vehicles such as pure electric vehicles that have no internal combustion engines whatsoever, as well as serial hybrid electric vehicles in which an internal combustion engine is used to provide energy for recharging the battery pack 30 but is not otherwise used to drive the wheels of the vehicle.

Still referring to FIG. 1, battery pack 30 is oriented in a longitudinal direction with respect to chassis 12 in the illustrative example. That is, a long dimension of the overall battery pack is generally parallel with a long dimension of vehicle 10 and/or chassis 12. In other embodiments, this need not be the case and battery pack 30 may be oriented in a lateral or side-to-side direction with respect to chassis 12 and/or vehicle 10, for example. This is not to exclude the possibility that an alternative battery pack according to this disclosure may be square shaped having length and width dimensions that are substantially equal. It is also possible that, in some embodiments, battery pack 30 may be oriented vertically such that its long dimension is oriented vertically, if desired. In other words, it is contemplated by this disclosure that battery pack 30 and variants thereof may be located anywhere on vehicle 10 and oriented in any desired manner at the discretion of the vehicle designer.

Referring now to FIG. 2, battery pack apparatus 30 has a housing 32 with a first side wall 32 configured to define a converging air inlet plenum 36 and a second side wall 38 configured to define a diverging air outlet plenum 40. Battery pack apparatus 30 also has a plurality of battery cells units 42 situated between air inlet plenum 36 and air outlet plenum 40. Each of the battery cell units 42 has first and second generally planar faces 44, 46. Battery cell units 42 are oriented in generally parallel spaced apart relation in the housing 32 such that a plurality of converging air flow spaces 48 are defined between the generally planar faces 44, 46 of adjacent battery cell units 42.

Each of the battery cell units 42 has a first end 50 adjacent air inlet plenum 36 and a second end 52 adjacent air outlet plenum 40. Thus, converging air inlet plenum 36 is considered to exist in the space between wall 34 and a plane defined by first ends 50 of battery cell units 42. Similarly, the diverging air outlet plenum is considered to exist in the space between wall 38 and a plane defined by the second ends 52 of battery cell units 42. Converging air flow spaces 48 between battery cell units 42 are in air flow communication with the inlet and outlet plenums 36, 40 and extend laterally with respect to battery pack 30 in substantially perpendicular relation with the planes defined by the ends 50, 52 of the battery cell units. Additional converging air flow spaces 48' are defined in the spaces between a first end wall 54 of housing 32 and planar face 44 of the next adjacent battery cell unit 42 and between a second end wall 56 of housing 32 and planar face 46 of the next adjacent battery cell unit 42. In the illustrative example, wall 54 is parallel with wall 56 such that the geometry of air flow spaces 48' are slightly different than the geometry of air flow spaces 48, but this need not be the case in other embodiments. For example, walls 54, 56 may be configured such that air flow spaces 48' have the same geometry as air flow spaces 48, if desired.

The terms "converging" and "diverging" as used herein, including in the claims, are intended to be with respect to the general direction of air flow through the associated space. Thus, for example, if an air passage or air space is said to be "converging" it means that the passage or space is generally narrowing in the direction of air flow. In contrast, if an air passage or air space is said to be "diverging" it means that the passage or space is generally widening in the direction of air flow. Thus, in general, from any particular location within an air space, a "converging" air space will be wider at upstream locations of the space and narrower at downstream locations of the space, whereas a "diverging" air space will be wider at downstream locations of the space and narrower at upstream locations of the space. Furthermore, it is within the scope of this disclosure for the battery cell units 42 to have regions near the inlets and outlets of the air flow spaces that are rounded or chamfered such that a relatively small portion of the air flow space widens in the direction of air flow at the outlet, but yet, in such examples, the overall air flow spaces are still considered to be diverging between the inlet and outlet ends of the air flow spaces according to this disclosure.

In the illustrative example shown in FIG. 2, inlet air moves through a main inlet opening 58 of housing 32 in a direction indicated by arrow 60 and advances through converging air inlet plenum 36 with portions of the inlet air being forced into the various air flow spaces 48 for movement through the spaces 48 in the directions indicated by the series of generally parallel arrows 62. As the inlet air moves through inlet plenum 36 from inlet opening 58 toward end wall 56 of housing 32, heat is convectively transferred from ends 50 of battery cell units 42 to the stream of air moving through air inlet plenum 36. Furthermore, as the air moves through air flow spaces 48 in the directions of arrows 62, heat is convectively transferred from planar faces 44, 46 of battery cell units 42 to the moving air. The heated air exits air flow spaces 48 between battery cell units 42, enters air outlet plenum 40, and advances through outlet plenum to an air outlet 64 of housing 32 where the heated air exits housing 32 as indicated by arrow 66 in FIG. 2.

The further that the inlet air moves through the converging air inlet plenum 36 and the further that the air moves through converging air spaces 48 between battery cell units 42, the more that the air has a tendency to be heated due to the increasing exposure of the air stream to the heated surfaces of battery cell units 42. However, because plenum 36 and air spaces 48 are converging spaces, the velocity of the air near the respective downstream ends of these spaces 36, 48 is faster than the velocity at the respective upstream ends of these spaces. However, the combination of the increasing air velocity and the converging air flow spaces 36, 48 results in the general overall effect of having a substantially constant flow rate (liter per minute) of air throughout the length of the converging passage. This compensates for the convective heating of the air as it moves through spaces 36, 48. The air outlet plenum 40 diverges so that an inappropriate amount of back pressure within housing 32 is avoided.

Based on the foregoing, it will be appreciated that the convection is higher or stronger near the exit end of air spaces 48 with the warmed-up air because the heat transfer boundary layer is getting thinner along the length of the air spaces 48 in the direction of air flow. The convection is lower or weaker near the inlet end of air spaces 48. With weak convection, the temperature difference between surfaces 44, 46 associated with a particular air space 48 and the local or adjacent air might be around 8° C. in some embodiments, such that if air entered the particular air flow space 48 at 20° C., for example, then surfaces 44, 46 would be about 28° C. near the inlet. Then, near the outlet of the particular air flow space 48, the thinner boundary layer due to the "squeezing" of the moving air may result in a temperature difference between surfaces 44, 46 and the local or adjacent air being around 2° C., for example. However, because the moving air has traveled past a majority of cells 42 at the outlet end of the particular air space 48, the air has heated to about 26° C., for example. Thus, 26° C. for the air plus 2° C. for convection delta T results in surfaces 44, 46 being about 28° C. which is the same as near the inlet of the particular air space 48.

In connection with FIG. 2, it should be appreciated that this is a diagrammatic cross sectional view and that the cross sectional shape of housing 32 and battery cell units 42 is contemplated as being maintained into and out of the page for a substantial portion of the depth of battery pack apparatus 30. Depending upon the amount of heat generated by battery cell units 42, it is contemplated by this disclosure that it is possible to fashion the convergence geometry of plenum 36 and the convergence geometry of air flow spaces 48 between walls 44, 46 of battery cell units 42, as well as the divergence geometry of outlet plenum 40, and to control the flow rate of air into air plenum 36 in a manner that results in the temperature across the faces 44, 46 of battery cell units 42 remaining substantially uniform between the leading edges and trailing edges of the battery cell units. In this regard, for some embodiments, the temperature is considered to be substantially uniform if the temperature gradient along the faces 44, 47 of battery cell units 42 from their leading edges to their trailing edges is no more than 3° Celsius. The leading edges of battery cells 42 are those regions or areas where faces 44, 46 meet respective first ends 50 and the trailing edges of battery cells 42 are those regions or areas where faces 44, 46 meet second ends 52. In some embodiments, these leading and trailing edges may be rounded or chamfered as alluded to previously in this disclosure.

Figure 3A:
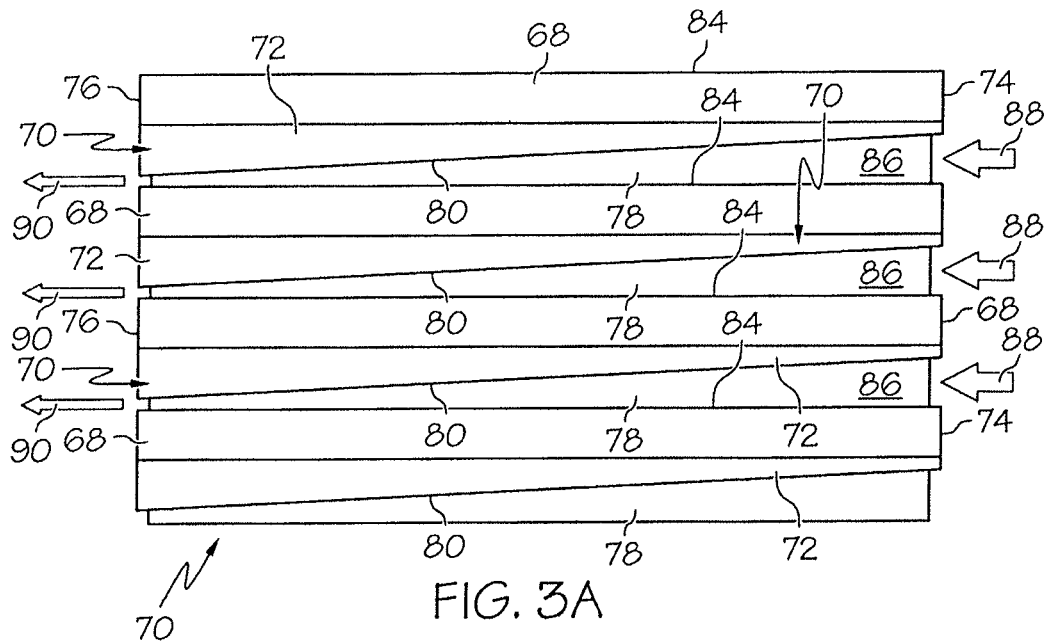
FIG. 3A is a diagrammatic top view of an alternative embodiment of a battery cell arrangement for a battery pack showing a plurality of battery cells of generally rectangular cross section, and a plurality of varying thickness walls, each varying thickness wall being situated adjacent one side of a respective battery cell, a spacer rib extending between each varying thickness wall and the next adjacent battery cell, and the varying thickness walls being oriented such that a plurality of converging air flow spaces are defined between the varying thickness walls and the next adjacent battery cells.
Figure 3B:
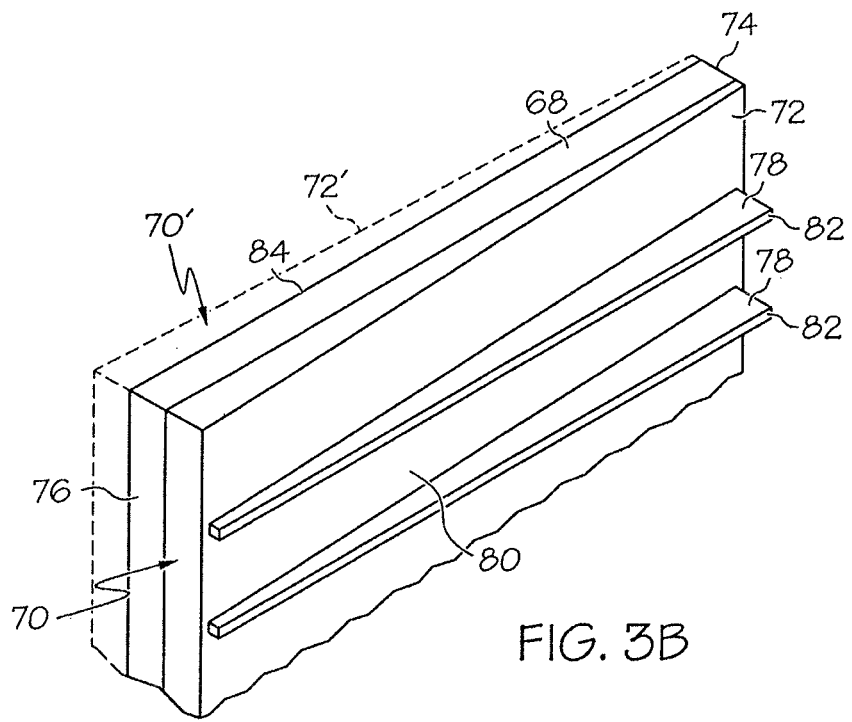
FIG. 3B is a diagrammatic perspective view of a portion of one of the battery cells of FIG. 3A, a portion of a first of wall of varying thickness (in solid) on one side of the battery cell, the portion of the first wall of varying thickness having a pair of spacer ribs extending therefrom in a cantilevered manner, and a second wall (in phantom) that may optionally be included on an opposite side of the battery cell from the first wall in some embodiments.

Many battery cells for use in automotive vehicles have generally rectangular cross sections when the cells are sectioned in a direction perpendicular to their large parallel main planar faces and their sides, as is the case with battery cells 68 shown in FIGS. 3A and 3B. Battery cells 68 like those shown in FIGS. 3A and 3B are sometimes referred to as prismatic battery cells and may be of the lithium ion variety. One example of such battery cells 68 are Model No. F014 battery cells available from EIG Ltd. of South Korea but similar types of battery cells are available from other manufacturers. These types of battery cells are sometimes referred to as "pop tarts" by those in the art since they are packaged in metal foil and have a tendency to resemble the breakfast food known by the same name.

According to this disclosure, however, battery cells for use in battery pack 30 may be constructed having generally elongated, trapezoidal cross sections like battery cell units 42 of FIG. 2. In such embodiments, no additional external coverings or jackets are needed to create the angled, non-parallel planar faces 44, 46 because the battery cells themselves are constructed with the appropriate cross sectional shape during manufacture to form converging air spaces 28 therebetween when placed in spaced apart, face-to-face relation. According to this disclosure, however, when battery cells 68 of rectangular cross section are used in battery pack 30, then appropriately shaped cell coverings may be situated adjacent the battery cells to create the desired converging air flow spaces. Such an example is shown in FIGS. 3A and 3B in which battery cells 68 have cell coverings 70.

Referring still to FIGS. 3A and 3B, each of the cell coverings 70 has a varying thickness wall 72 which increases in thickness from an air inlet end 74 of the associated battery cell 68 to an air outlet end 76 of the associated battery cell 68. Illustrative cell coverings 70 also have a set of spacers or ribs 78, two of which are shown in FIG. 3B, that extend outwardly in a cantilevered manner from a planar face 80 of cell covering 70. Ribs 78 each have an outer edge 82 that engages a planar face 84 of the next adjacent battery cell 68. Suitable fasteners, such as layers of adhesive, are used to couple cell coverings 70 to battery cells 68 in some embodiments. Other types of fasteners, such as clips, caps, straps, bands, etc., may be used alone or in combination with any other types of fasteners, to couple battery cells 68 and cell coverings 70 together in other embodiments, if desired.

Cell coverings 70 are sized and configured so that converging air flow spaces 86 are defined between planar faces 80 of cell coverings 70 and planar faces 84 of the next adjacent battery cells 68. According to this disclosure, housing 32 of battery pack 30 shown in FIG. 2 may contain a stacked arrangement of battery cells 68 with cell coverings 70 therebetween in lieu of battery cell units 42. In such an arrangement, inlet air enters converging air flow spaces 86 adjacent first ends 74 of battery cells 68 as indicated by arrows 88 shown in FIG. 3A and outlet air exits from converging air flow spaces 86 adjacent second ends 76 of battery cells 68 as indicated by arrows 90. According to this disclosure, cell coverings 70 may be made from a plastics material or from a metal material, such as aluminum.

In the illustrative example of FIGS. 3A and 3B, one planar face 84 is left exposed to the associated air flow space 86 whereas the opposite planar face of battery cell 68 is covered by a respective cell covering 70. In an alternative embodiment, planar faces 84 of battery cells 68 may also be covered by a cell covering 70' as shown in FIG. 3B (in phantom). In such an alternative embodiment, planar faces 72, 72' of respective cell coverings 70, 70' are oriented substantially similar to planar faces 44, 46 of battery cell units 42 of FIG. 2. Also, in some such alternative embodiment, the geometry of spacers 78 are adjusted accordingly so that edges 82 are oriented properly to engage faces 72' of the next adjacent cell covering. Other spacer geometries are possible, such as for example, having spacers 78 configured so that edges 82 of adjacent ribs 78 contact each other or having the spacers 78 that extend from face 72 of cell covering 70 being staggered in height as compared to the spacers (not shown, but similar to ribs 78) extending from face 72' of cell covering 70'. As was the case with the embodiment of FIG. 2, in the embodiment of FIGS. 3A and 3B (as well as the variants thereof), the increasing rate of air flow through air flow spaces 86 due to the converging shape of these spaces 86 helps to maintain a fairly uniform temperature across battery cells 68 from the first ends 74 to the second ends 76 thereof.

Referring now to FIGS. 4-20, additional details of one embodiment of battery pack apparatus 30 are shown. Battery pack 30 has a top plate assembly 92 situated atop a stacked row or array of battery cell units 42 as shown, for example, in FIGS. 4 and 5. The battery cell units 42 shown in FIGS. 5 and 8-12 are sometimes referred to herein as battery cell trays 42 or battery cell cassettes 42. Top plate assembly 92 has a generally flat and rectangular top wall 94 that supports a row of wide U-shaped brackets 96, a row of narrow U-shaped brackets 98, a positive terminal bracket 100 and a negative terminal bracket 102 as shown, for example, in FIGS. 4-6.

Figure 4:
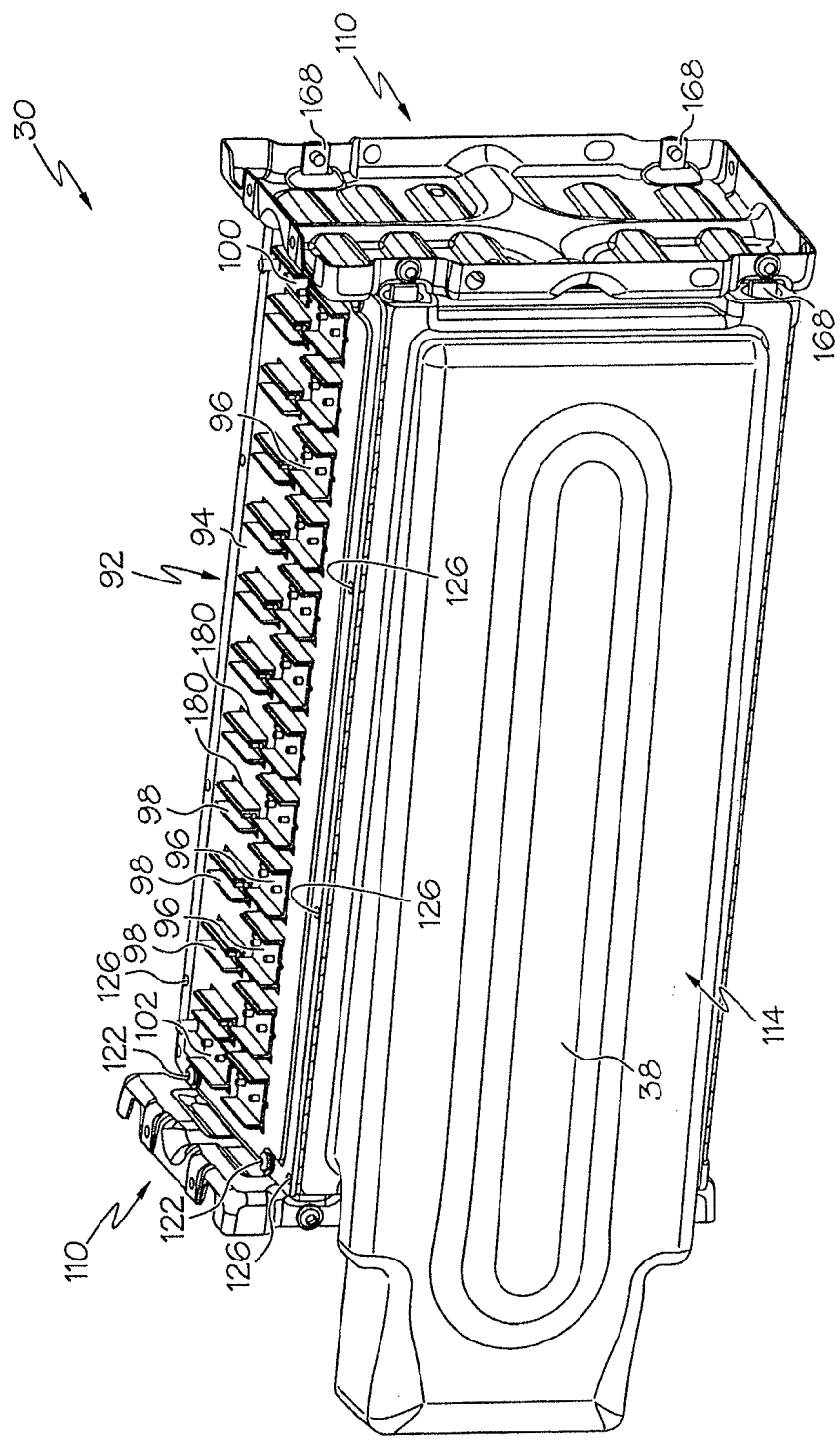
FIG. 4 is a perspective view of a battery pack apparatus showing an air inlet header extending along a side of the battery pack, first and second end plates at opposite ends of the battery pack apparatus, and a top plate assembly with a plurality of brackets that provide positive and negative terminal connection points for battery cells of the battery pack apparatus.
Figure 5:
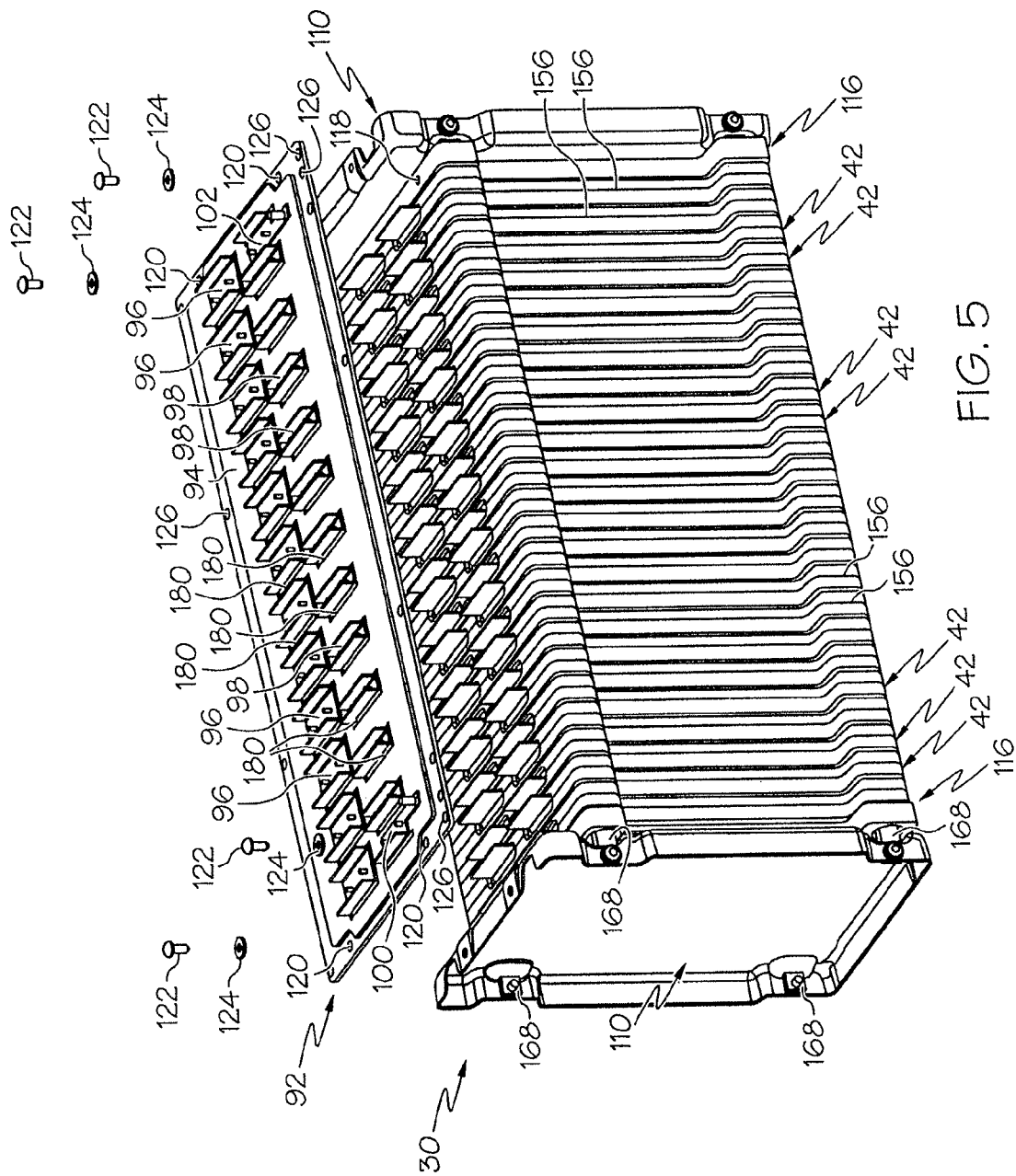
FIG. 5 is a perspective view of the battery pack apparatus, similar to FIG. 4 but with the air inlet header removed, showing the top plate assembly exploded up and away from a plurality of stacked battery cell trays or cassettes that are sandwiched between the end plates of the battery pack apparatus, each of the battery cell cassettes being vertically oriented, and positive and negative terminal tabs of the battery cells that are contained within the cassettes extending upwardly through openings provided at the top of each of the battery cell cassettes.

Battery pack 30 has a first and second end plates 110 located at the opposite ends of the battery pack 30 as shown, for example, in FIGS. 4 and 5. Battery pack 30 also has an air inlet header 112, shown in FIG. 6, adjacent one side of battery pack 30 and an air outlet header 114, shown in FIGS. 4 and 6, adjacent an opposite side of battery pack 30. Air inlet header 112 includes sidewall 34 and air outlet header includes side wall 38. Thus, air inlet header 112 is shaped to provide battery pack 30 with its converging air inlet plenum 36 and air outlet header 38 is shaped to provide battery pack 30 with its diverging air outlet plenum 40. In the illustrative embodiment, end plates 110 are made of steel and headers 112, 114 are made from a plastics material such as Noryl GTX 810. However, it is within the scope of this disclosure for end plates 110 and headers 112, 114 to be made from any material having suitable strength, such as aluminum, for example. Composite materials can be used to make end plates 110 and headers 112, 114, if desired.

Figure 8:
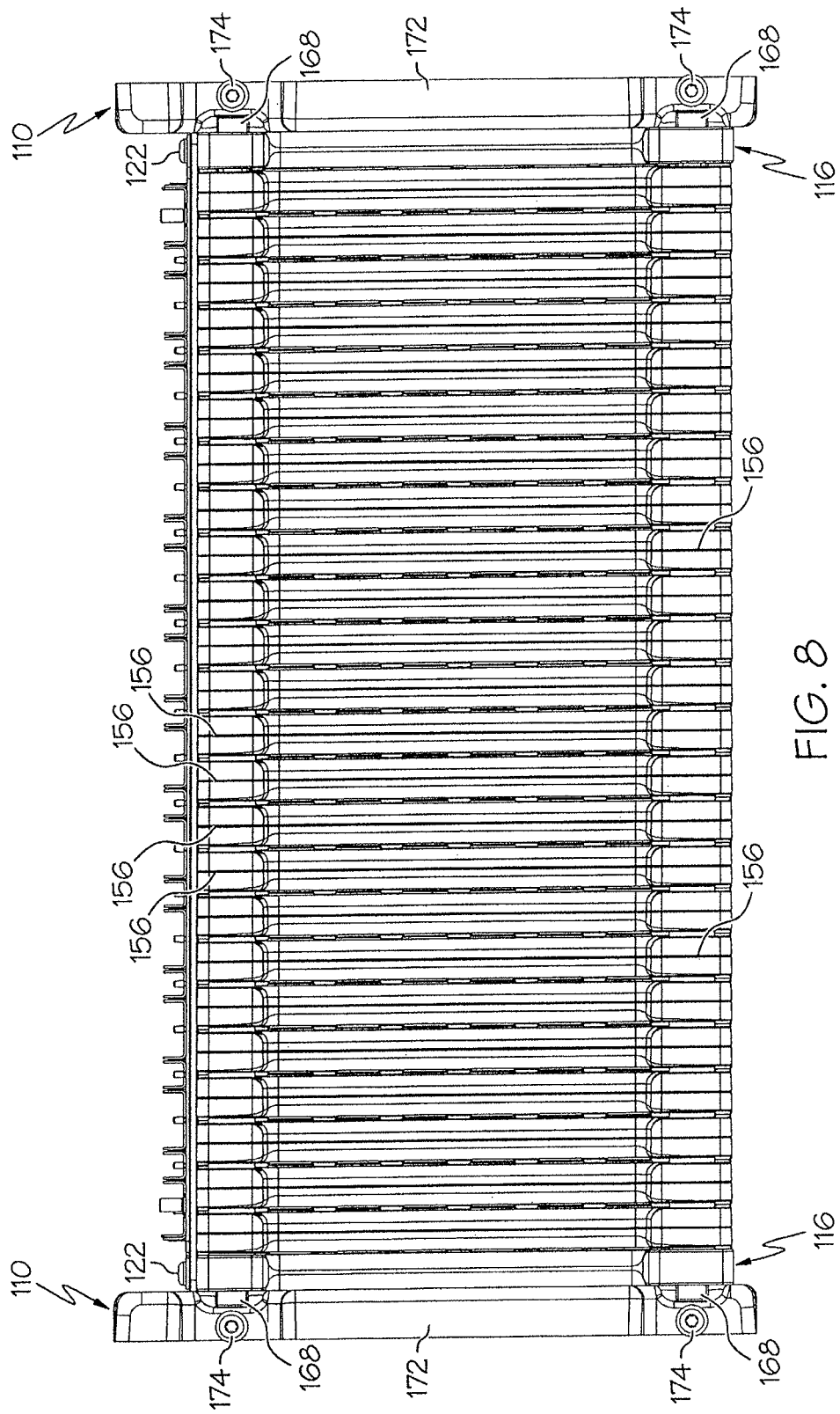
FIG. 8 is a side elevation view of the first and second end plates and the plurality of battery cell cassettes that are sandwiched between the first and second end plates.
Figure 9:
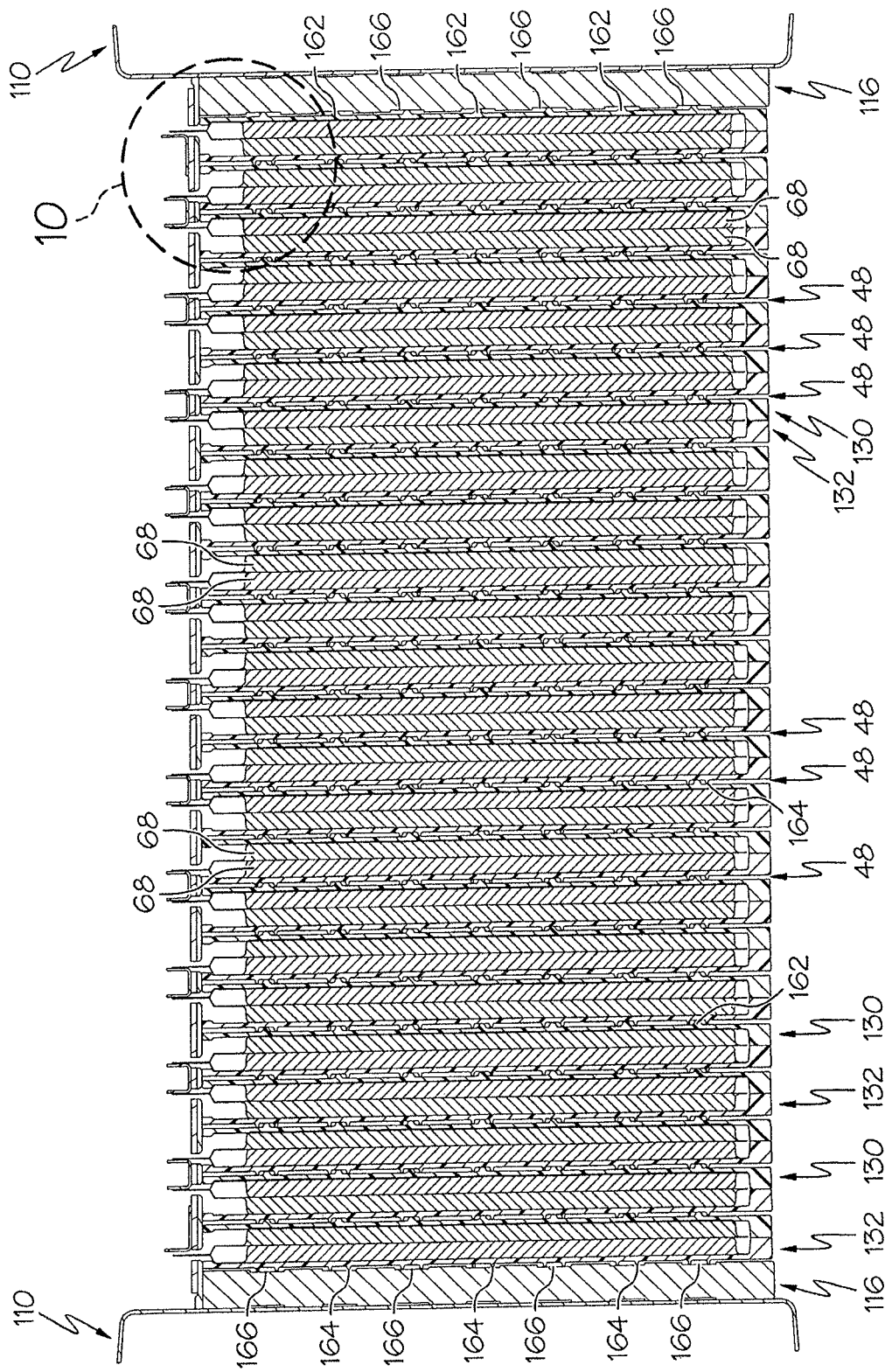
FIG. 9 is a cross sectional view, taken along line 9-9 of FIG. 7, showing that each of the battery cell cassettes contain two battery cells within an internal space of each cassette and showing a pair of dummy cassettes or trays that have no battery cells contained therein and that are situated adjacent respective ones of the end plates.

Battery pack has a pair of end trays 116 each of which is situated adjacent a respective end plate 110 as shown in FIGS. 5, 8 and 9. End trays 116 are sometimes referred to herein as dummy trays 116. Each end tray 116 has a pair of threaded bores 118, one of which can be seen in FIG. 5, formed at its upper end. Top plate 114 has four apertures 120, each of which is aligned with a respective bore 118. Bolts 122 extend through apertures 120 and are threaded into bores 118 of end trays 116 to fasten top plate assembly 92 in place on battery pack 30. Washers 124 are interposed between the heads of bolts 120 and plate 94 in the illustrative example.

In some embodiments, a generally flat rectangular bottom plate (not shown) is provided and fastens to the bottom of end trays 116 in a similar manner. Plate 94 has a series of apertures 126, shown best in FIG. 6, along each of the opposite side edges thereof that receive suitable fasteners, such as bolts similar to bolts 122, to fasten headers 112, 114 in place on battery pack 30. In those embodiments having a bottom plate, apertures similar to apertures 126 of plate 94 are provided for receipt of additional fasteners to further fasten headers 112, 114 in place.

As mentioned above, battery pack 30 has a stacked array of battery cell trays 42. As shown best in FIG. 12, each battery cell tray 42 has a first tray half 130 and a second tray half 132. Each tray half 130, 132 has a generally rectangular recess 134 such that, when the tray halves 130, 132 are mated together, an internal space is provided by the recesses 134 for receiving first and second battery cells 68. Tray halves 130, 132 are generally rectangular and each have a top wall 136, a bottom wall 138, and a pair of side walls 140 interconnecting the top and bottom walls 136, 138. The walls 136, 138, 140 of tray halves 130, 132 from a rim that surrounds recess 134. However, top wall 136 of each tray half is formed to include two notches 142. When tray halves 130, 132 are joined together, the notches 142 cooperate with each other to provide a pair of openings (referred to herein as "openings 142") through which positive terminal tabs 144 and negative terminal tabs 146 of battery cells 68 extend.

Figure 12:
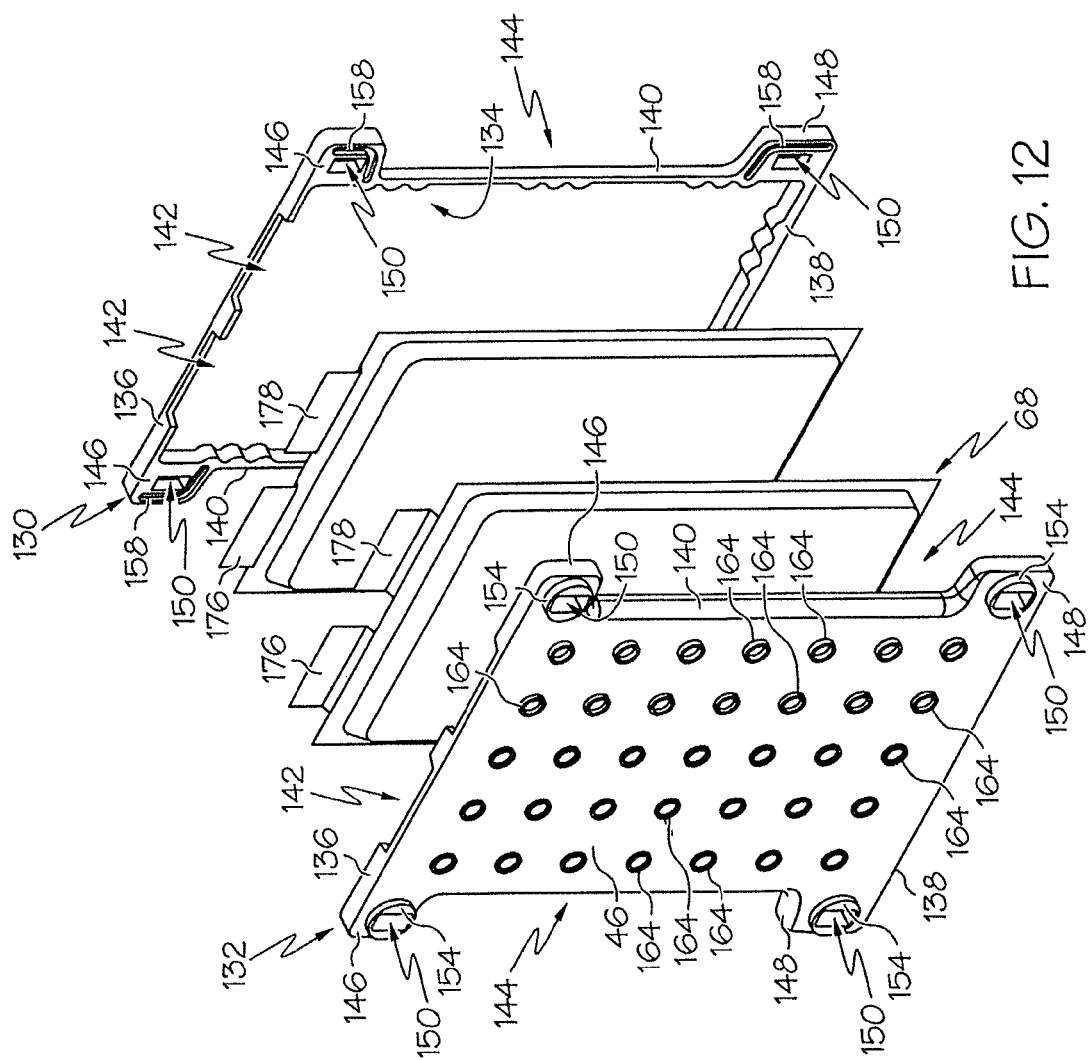
FIG. 12 is an exploded perspective view showing further details of the tray-like shell halves of the battery cell cassette and the associated battery cells.

Side walls 140 are each formed to include a cutout or recess 144 as shown in FIG. 12. Recesses 144 are configured such that tray halves 130, 132 have a pair of upper ears 146, each of which is situated above a respective recess 144, and a pair of lower ears 148, each of which is situated below a respective recess 144. Each ear 146, 148 has a generally rectangular aperture 150 extending therethrough. The ears 146, 148 of first tray half 130 each have a depression or recess 152 as shown for example in FIG. 17, and the ears 146, 148 of second tray half 132 each have a protrusion 154 as shown in FIGS. 12-14 and 16. When the battery cell units 42 are stacked together, the protrusions 154 of each tray half 132 are received in the depressions 152 of the next adjacent tray half 130 except for the battery cell units 42 at the extreme ends of battery pack 30, in which case the depressions 152 of the battery cell unit 42 at one end of battery pack 30 receive appropriately configured protrusions that extend from one of dummy trays 116 and the protrusions 154 of the battery cell unit 42 at the opposite end of battery pack 30 are received in appropriately configured depressions of the other of the dummy trays 116.

In the illustrative example, three out of four of the depressions 152 of each tray half 130 are circular in shape and the fourth depression 152 is oval in shape. Similarly, three out of four of the protrusions 154 are circular in shape and the fourth protrusion is oval in shape. The non-round depressions 152 and protrusions 154 of the battery cell units 42 assure that the battery cell units 42 are stacked together in the proper orientation.

Figure 14:
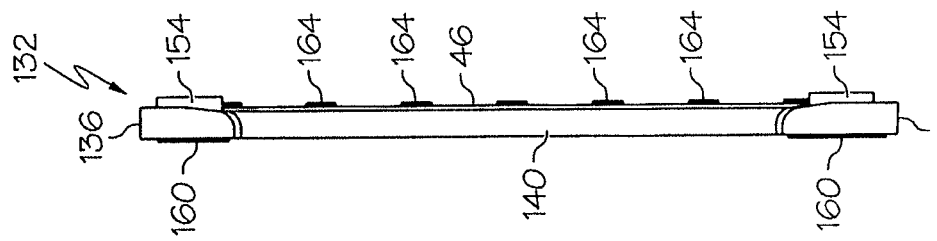
FIG. 14 is a side elevation view of the tray-like shell half of FIG. 13.

Each of the ears 146, 148 of each tray half 130 has an L-shaped groove 158, as shown in FIGS. 12 and 19, and each of the ears 146, 148 of each tray half 132 has an L-shaped rib 160, as shown in FIGS. 14-16. When the tray halves 130, 132 are mated together, each rib 160 is received in a respective groove 158 to help maintain tray halves 130, 132 in proper alignment with one another. When the tray halves 130, 132 are mated together, a cell covering or heat transfer jacket 130, 132 is formed and has a peripheral seam 156 that extends around the top, bottom and sides of the cell covering 130, 132.

Figure 10:
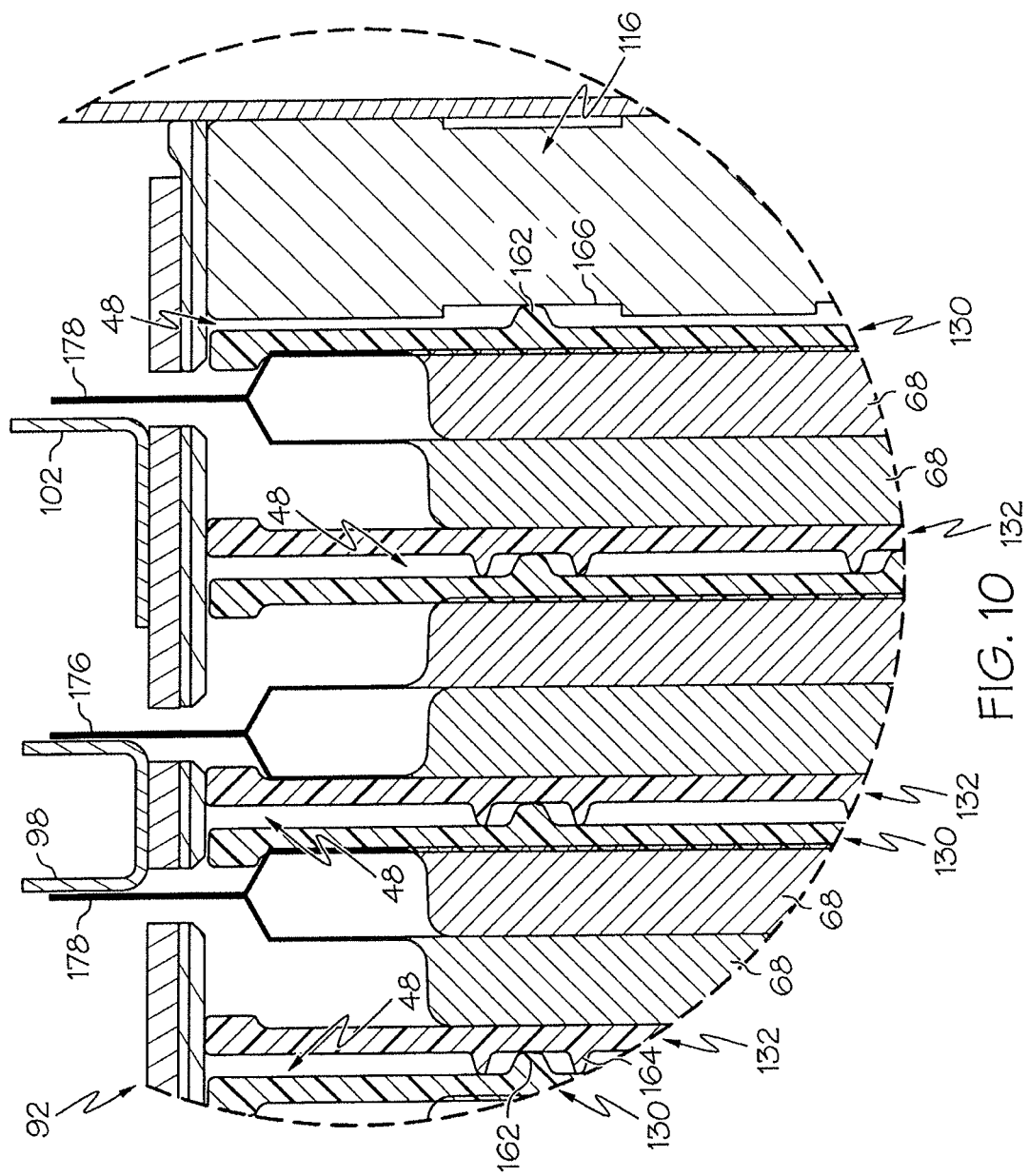
FIG. 10 is an enlarged cross sectional view, taken along dotted line 10 of FIG. 9, showing the terminal tabs of the pair of battery cells within each of the battery cells cassettes merged together at their upper ends and showing the merged terminal tabs extending upwardly through respective openings in the top plate assembly into juxtaposition with a respective terminal connection points of the brackets of the top plate assembly for coupling thereto.

Each tray half 130 includes first planar face 44 and each tray half 132 includes second planar face 46. The front walls of tray halves 130, 132 which provide planar faces 44, 46, respectively, have varying thickness so that when battery cell units 42 are stacked a plurality of generally parallel converging air flow spaces 48, a portion of which are shown in FIG. 10, are formed. In some embodiments, tray halves 130, 132 are made from a plastics material such as Noryl GTX 810 material. However, tray halves 130, 132 may be made from other materials, such as aluminum which have suitable strength and heat transfer characteristics.

In one embodiment, the spacing or gap between the confronting planar faces 44, 46 that define air flow spaces 48 is about 2.5 millimeters (mm) at the inlet end and is about 0.5 mm at the outlet end. However, other embodiments in which the spacing between battery cell units 42 is larger or smaller than the given example are within the scope of this disclosure. It has been found that suitable battery cooling can be achieved with a ratio of inlet gap size to outlet gap size of about 4 to 5. Of course, other factors such as fan or blower capacity and ambient air temperature play a role, and so other ratios of inlet to outlet gap size may be suitable in other embodiments. Air flow spaces 48', one of which is shown in FIG. 10, are located between battery cell units 42 and dummy trays 116 at the opposite ends of battery pack 30 and have slightly different geometries than air flow spaces 48. The front and rear faces of dummy trays 116 are parallel and so, in the illustrative example, air flow spaces 48' are roughly half the size of air flow spaces 48.

Figure 13:
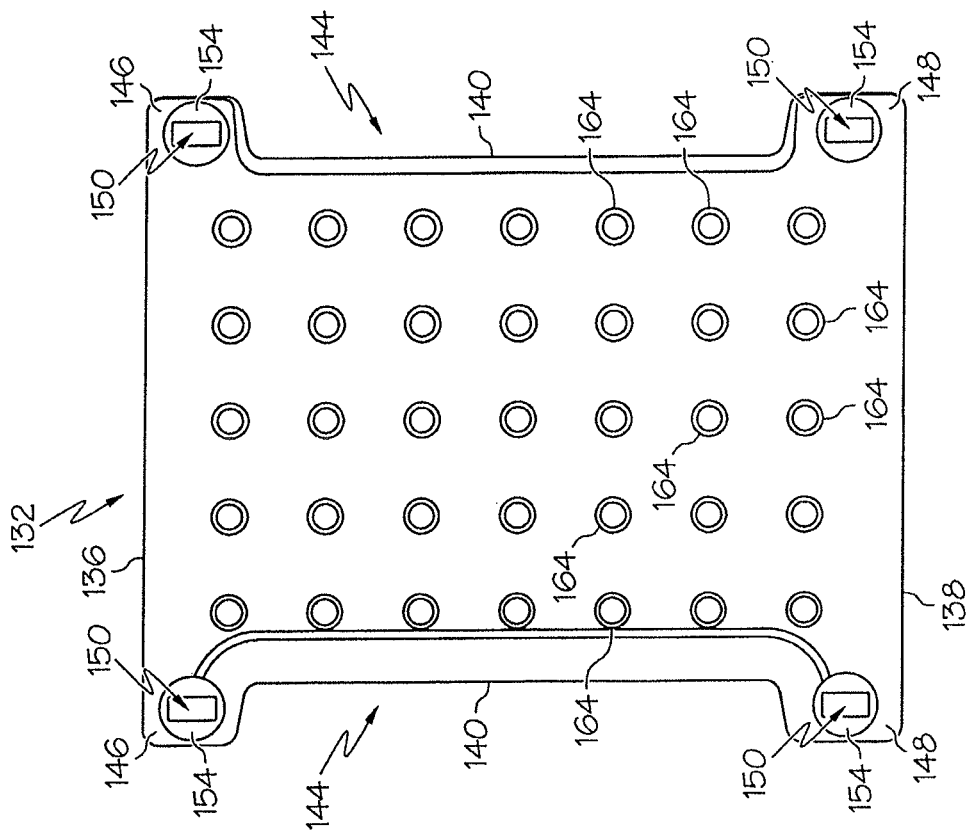
FIG. 13 is a front elevation view of one of the tray-like shell halves showing a plurality of circular pedestal landings arranged in a grid pattern on a front face of the shell half and showing a recess in each of the sides of the shell half such that a pair of upper ears are provided above the recesses and a pair of lower ears are provided below the recesses, each upper and lower ear having a rectangular aperture that is sized to receive a respective one of the four coupling bars.

Each first tray half 130 has a plurality of standoffs 162 extending away from planar face 44 and each second tray half 132 has a plurality of standoffs 164 extending away from planar face 46. In the illustrative embodiment, standoffs 162 are posts or pedestals (sometimes referred to herein as posts 162 or pedestals 162) and standoffs 164 are post receivers or pedestal receivers (sometimes referred to herein as post receivers 164 or pedestal receivers 164). Posts 162 are frustum conical shaped protrusions in the illustrative example, but may have other shapes, such as cylindrical, in other embodiments. Post receivers 164 are generally cylindrical ring shaped protrusions in the illustrative example. Pedestals 162 and pedestal receivers 164 are arranged in a grid pattern on the respective planar faces 44, 46 as shown in FIGS. 13 and 17, for example. When the battery cell cassettes 42 are stacked together, each pedestal 164 is received in a companion pedestal receiver 164 except for the battery cell cassettes 42 at the extreme ends of battery pack 30 in which case the pedestals 162 and pedestal receivers 164 are received in depressions 166 formed in the dummy trays 116 as shown in FIG. 9.

Figure 11:
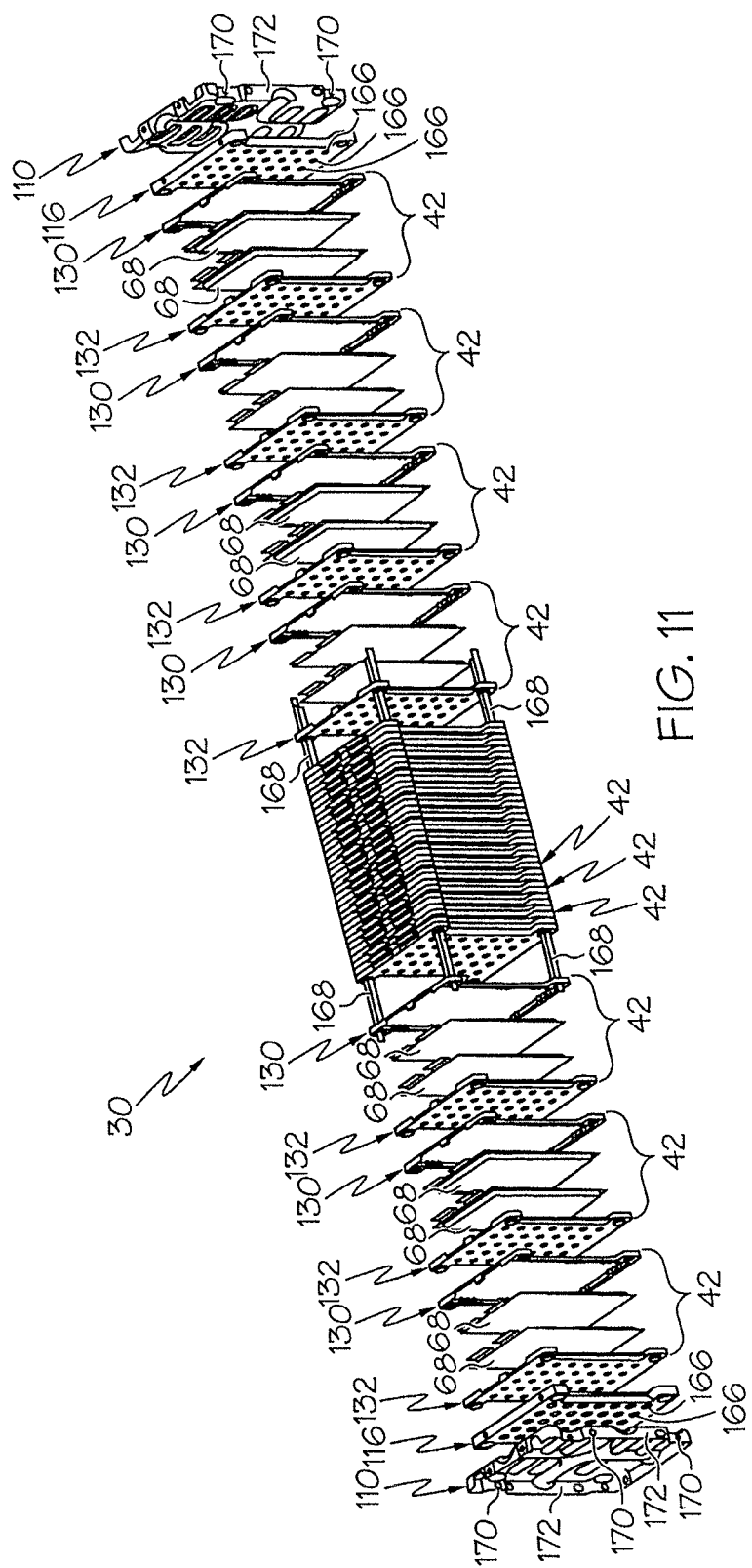
FIG. 11 is an exploded perspective view showing the first and second end plates exploded away from four coupling bars of the battery pack apparatus and showing several of the battery cell cassettes also exploded away from the coupling bars, the exploded away battery cell cassettes being separated into first and second tray-like shell halves with the pair of battery cells of each battery cell cassette situated between respective shell halves, and showing several of the battery shell cassettes remaining mounted on the coupling bars.

When the battery cell units 42 are stacked together, the rectangular apertures 150 in the upper and lower ears 146, 148 are aligned and battery pack 30 has four coupling rods or bars 168, each of which extends through a respective set of the aligned apertures 150 as shown best in FIG. 11. Dummy trays 116 also have ears with apertures that are similar to ears 146, 148 and apertures 150 of battery trays 42 and that receive rods 168. The end regions of coupling rods 168, which extend beyond dummy trays 116, are necked down and have threaded apertures that are aligned with respective holes 170 provided in side walls 172 of end plates 110. Bolts 174 extend through holes 170 into threaded engagement with the apertures provided at the ends of coupling bars 168. Thus, coupling bars 168 hold the stacked array of battery trays 42, as well as dummy trays 116, in place between end plates 110.

Figure 6:
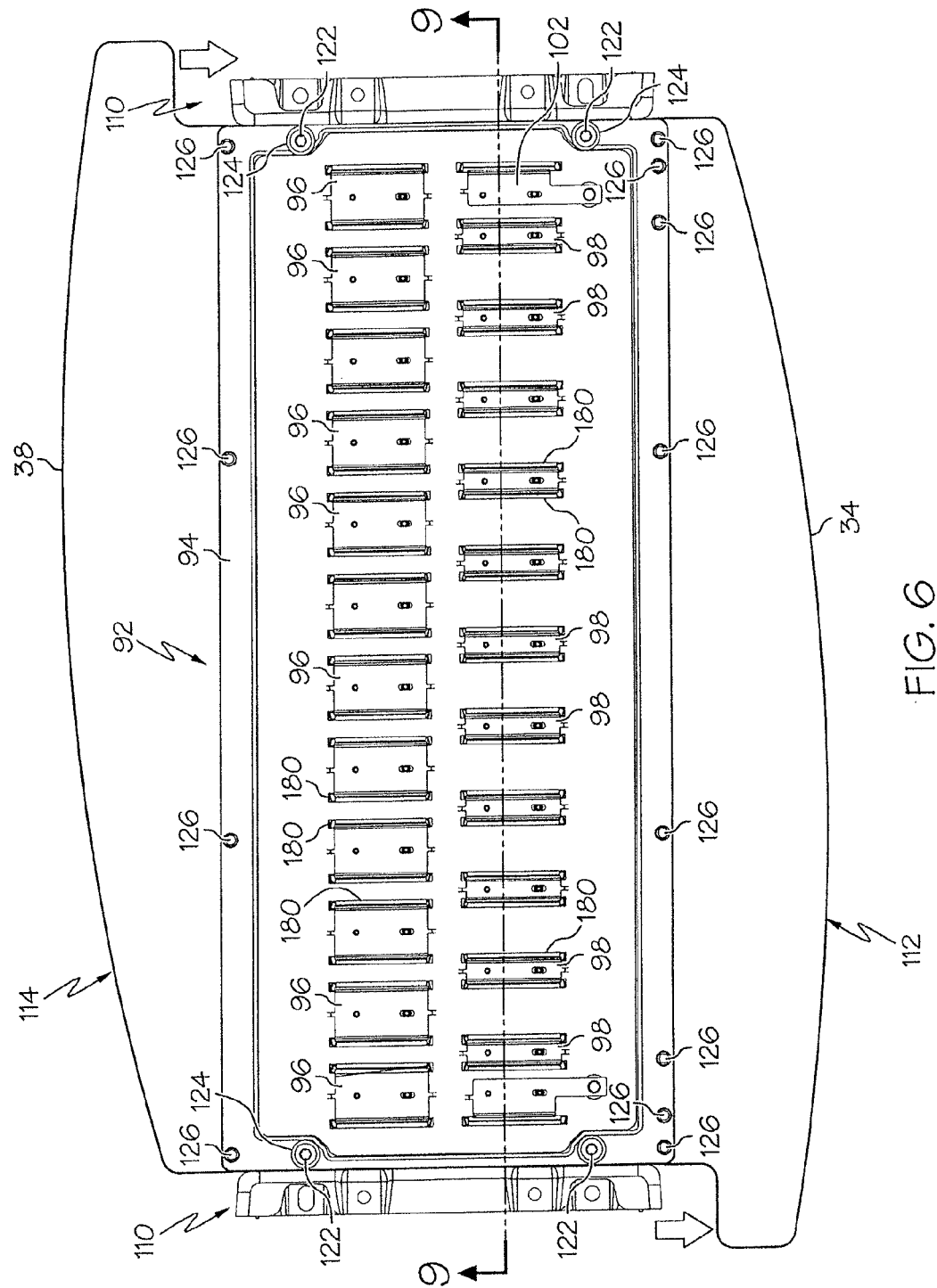
FIG. 6 is a top plan view of the top plate assembly and the first and second end plates of the battery pack apparatus.
Figure 7:
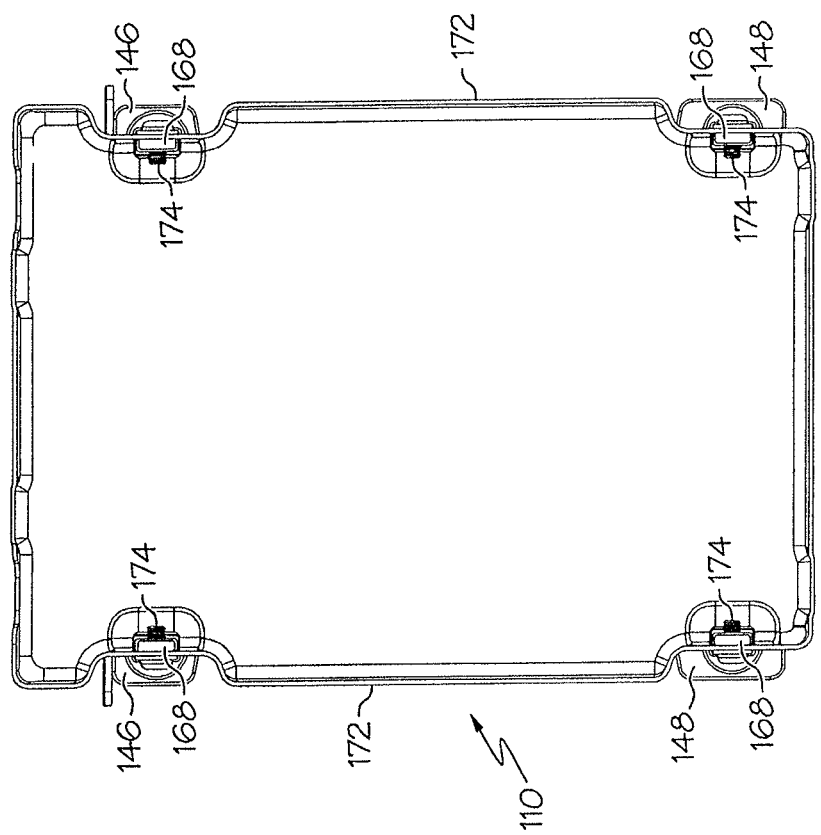
FIG. 7 is a front elevation view of the first end plate.

As previously mentioned, the internal space formed by recesses 134 of tray halves 130, 132 of each battery cell unit 42 receives two battery cells 68 therein. Each battery cell 68 has a positive terminal tab 176 and a negative terminal tab 178 as shown, for example, in FIG. 12. Top plate assembly 92 has a plurality of slots or openings 180 as shown in FIGS. 4-6. Tabs 176, 178 extend upwardly from the main body of battery cells 68 through respective holes defined by notches 142 provided in top walls 136 of tray halves 130, 132 and through slots 180 of top plate assembly 92 into juxtaposition with respective upstanding portions of U-shaped brackets 96, 98, with the exception of the tabs 176 associated with positive terminal bracket 100 and tabs 178 associated with negative terminal bracket 102. Tabs 176, 178 are attached, such as by ultrasonic welding, to respective brackets 96, 98, 100, 102.

The orientation of battery cells 68 within cell coverings 130, 132 alternates from battery cell unit 42 to battery cell unit 42. Thus, each bracket 96, 98 electrically couples the positive terminal tabs 176 of the battery cells 68 of one battery cell unit 42 to the negative terminal tabs 178 of the battery cells 68 of the next adjacent battery cell unit 42 as shown in FIG. 10 with regard to one of brackets 98. In the illustrative embodiment, battery pack 30 has forty eight battery cells 68 contained in pairs within twenty four cell coverings 130, 132. However, it is within the scope of this disclosure for more or less battery cells 68, as well as more or less cell coverings 130, 132, to be included in a battery pack.

With the inlet and outlet headers removed, battery pack 30 of FIGS. 4-20 has an overall length of about 555.5 mm, a height of about 284.2 mm, and a width of about 220 mm. Tray halves 130, 132 are about 236.5 mm in height, 203 mm in width, and 9.35 mm in depth (not including the standoffs 162, 164). Thus, the depth of a cell covering is about 18.7 mm. The dummy trays are made of an insulator material such as aluminum or a plastics material. The end plates 110 and coupling rods 168 are made of steel. The sizes and materials described above with regard to the FIG. 4-20 embodiment of battery pack 30 are not intended to be limiting. Thus, battery packs 30 of any suitable size and shape made from any suitable materials are intended to be within the scope of this disclosure.

As mentioned previously, vehicle 10 has a battery management system controller 27. As shown diagrammatically in FIG. 21, a plurality of temperature sensors 182 are coupled to battery management system 27 to provide input signals thereto. The temperature sensors 182 are mounted to various ones of the cell coverings 130, 132 of battery cell units 42 of battery pack 30. In one embodiment, temperature sensors 182 are mounted to the cell coverings 130, 132 of the battery cell units 42 at the extreme ends of battery pack and at least one additional temperature sensor is mounted to one of the battery cell units 42 in the middle region of battery pack 30. Temperature sensors 182 are thermistors in some embodiments.

Based on the input signals from the temperature sensors 182, controller 27 adjusts the speed of an adjustable speed blower or fan 184. For example, in some embodiments, controller 27 adjusts the duty cycle of a pulse width modulated (PWM) output signal that is used to control the speed of fan 184. Controller 27 is programmed so that, if the temperature sensed by any single sensor 182 exceeds a threshold value, the speed of the fan 184 is increased. In addition, controller 27 is programmed to calculate difference values between the temperatures indicated by the various temperature sensors 182 and if any of the calculated difference values exceed a difference threshold, the speed of the fan 184 is increased. This facilitates keeping the temperatures of all of the battery cells 68 relatively uniform. Thus, controller 27, temperature sensors 182 and fan 184 serve as an air flow control system for the battery pack 30. If the temperatures sensed by sensors 182 and the calculated temperature differences are all below the respective thresholds, then controller 27 incrementally decreases the speed of fan 184 at predetermined time intervals so as to reduce the amount of power expended on operating the fan 184.

Figure 22:
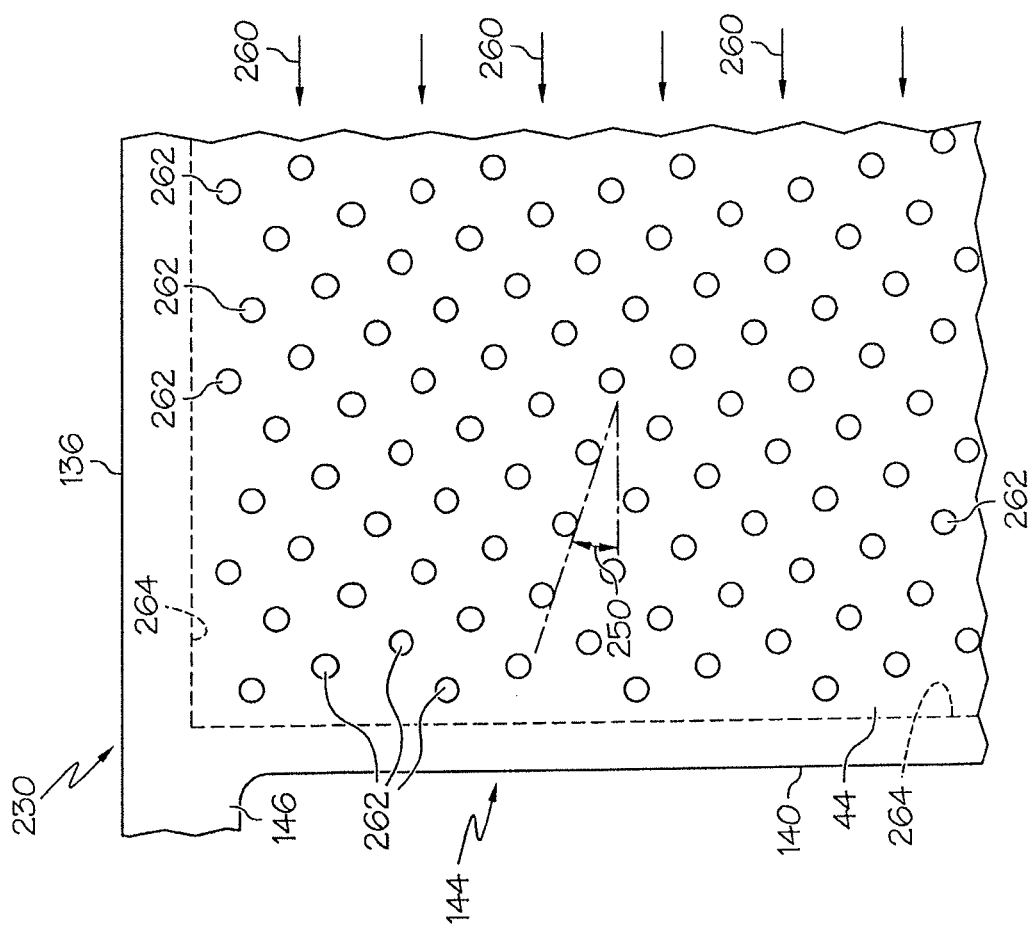
FIG. 22 is a front elevation view of a portion of an alternative tray-like shell half of an alternative embodiment battery cell cassette showing posts or pillars that are in a skewed arrangement on a planar face of the shell half relative to the sides of the shell half to reduce the formation of horizontal hot zones.

Referring now to FIG. 22, a portion of an alternative tray half 230 of an alternative embodiment battery cell cassette is shown. Tray half 230 is similar to the tray half 130 described above and so like reference numerals are used to denote portions of tray 230 that are substantially similar to tray half 130. The main difference between tray half 130 and tray half 230 is that the grid pattern of posts or pillars 262 of tray half 230 are skewed at an angle 250 on planar face 44 of tray half 230 relative to top edge 136 and bottom edge (not shown of tray half 230. In the illustrative example, the angle 250 at which the rows of pedestals are skewed relative to the top and bottom edges is about 15° as shown in FIG. 22. However, it is within the scope of this disclosure for posts 262 to be skewed at other angles, such as angles that are greater than or less than 15°. In contrast, the rows of posts 162 of tray half 130, shown in FIG. 17, are parallel with the top wall 136 and bottom wall 138 and are perpendicular to the side walls 140 of tray half 130.

Skewing the rows of posts 262 of tray half 230 by angle 250 relative to the top wall 136 and bottom wall (not shown) also skews the rows of posts 262 relative to the direction of air flow which air flow is generally parallel with the top and bottom walls of tray half 130 as indicated by the series of arrows 260 in FIG. 22. The skew pattern of posts 262 enhances scattering of the air flow through the associated air flow space thereby enhancing the convective cooling by reducing the tendency that hot spaces can form in horizontal zones between the posts 262. Thus, in the illustrative example, the post pattern is an equilateral triangle matrix skewed to the direction of air flow. Also, in the illustrative example, the posts 262 at the outer boundary of the post grid pattern are located on the planar face 44 at least one diameter inwardly away from the battery cell envelope 264.

It will be appreciated that the tray half (not shown) adjacent to tray half 230 has post receivers, sometimes referred to as craters, skewed in a complementary pattern to receive the posts 262 of tray half 230. In some embodiments, the top region of planar face 44 above battery cell envelope 264 and the bottom region of planar face 44 below battery cell envelope 243 is shaped as a raised ramp that forms a 0.7 mm gap with an adjacent cell face. That is the top and bottom regions of tray half 230 in the areas above and below the portion of planar face 44 that has the posts 262 serve as seal foundations with raised ramps.

Figure 23:
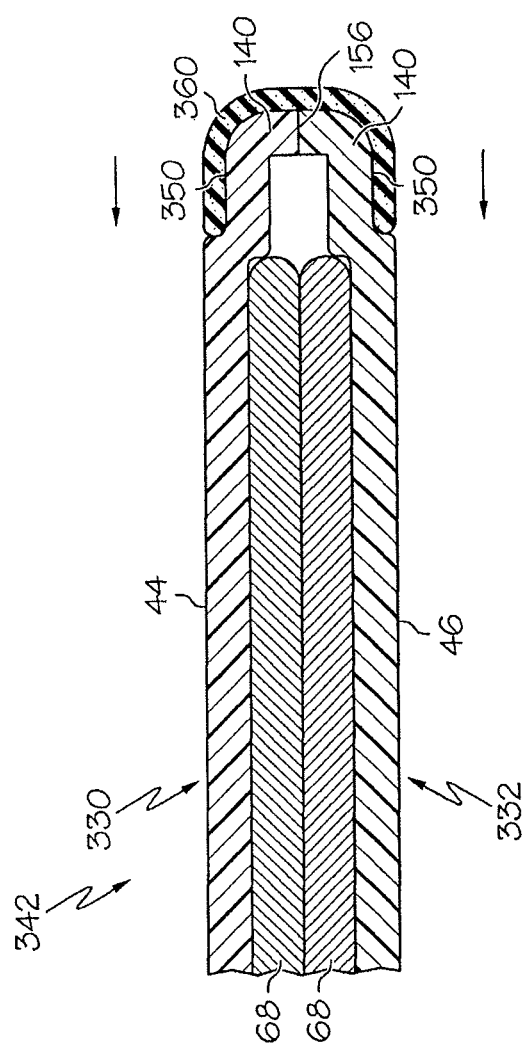
FIG. 23 is a cross-sectional view of a portion of an alternative battery cell unit, taken along a plane that is perpendicular to the planar faces of the heat transfer jacket around the battery cells and that is located about halfway between the top and bottom of the battery cell unit, showing recesses in the planar faces near a leading edge of the heat transfer jacket to accommodate foam insulation tape that is provided along the leading edge.

Referring now to FIG. 23, a portion of an alternative battery cell unit 342 is shown in cross section. Battery cell unit 342 has alternative tray halves 330, 332 which each have a recess 350 formed in the respective planar faces 44, 46 near the leading edge of unit 342. An insulator 360 is provided along the leading edge of battery cell unit 342 and has portions that are received in the recesses 350 of tray halves 330, 332. In the some embodiments, insulator 360 comprises foam tape. The insulator 360 extends along the leading edge of unit 342 to cover side walls 140 and recesses 350 of tray halves 330, 332 in the region of the leading edge between the upper and lower ears (not shown, but similar to ears 146, 148 of unit 42). Thus, a battery cell apparatus having a plurality of stacked battery cell units 342 with insulators 360 wrapped around the lead edges of the respective cell units 342 is contemplated by this disclosure. By providing insulators 360 at the air inlet end of battery cell units 342, a thermal fin effect at the leading edge of the cell units 342 is minimized to inhibit generation of cool spots in the battery cells 68 near the leading edges of the battery cell units. This, in turn, promotes a more uniform temperature in battery cells 68 between the leading and trailing edges of battery cell units 342. In one embodiment, the foam tape used has a width of about 8 mm and a thickness of about 1 mm.

It is contemplated by this disclosure that, in some embodiments, pedestal receivers are omitted such that pedestals or posts 162, 262 simply abut a flat planar face of the next adjacent battery cell unit. In other embodiments, each planar face of the battery cell units includes posts or pedestals like posts 162, 262. In such embodiments, the posts are arranged to somewhat interlace with one another. That is, each post extending from one planar face of adjacent pairs of confronting planar faces contacts the planar face of the other planar face in a space between the posts of that other planar face.

Although certain illustrative embodiments have been described in detail above, many embodiments, variations and modifications are possible that are still within the scope and spirit of this disclosure as described herein and as defined in the following claims.

The invention claimed is:
1. A battery pack apparatus comprising
a plurality of generally flat battery cells,
a plurality of heat transfer jackets, each heat transfer jacket encasing at least one of the plurality of battery cells, the plurality of heat transfer jackets being arranged in spaced apart fact-to-face relation and being configured such that a plurality of generally parallel converging air flow spaces are defined between the spaced apart faces of adjacent heat transfer jackets,
a top plate above the plurality of heat transfer jackets,
a bottom plate beneath the plurality of heat transfer jackets,
an air inlet duct covering a first side of the plurality of heat transfer jackets, the air inlet duct being shaped to define a converging air inlet plenum that becomes narrower in a direction from a first end of the battery pack apparatus toward a second end of the battery pack apparatus, and
an air outlet duct covering a second side of the plurality of heat transfer jackets, the air outlet duct being shaped to define a diverging air outlet plenum that becomes wider in a direction from the first end of the battery pack apparatus toward the second end of the battery pack apparatus, wherein each of the air flow spaces is in air flow communication with the first and second plenums, wherein the air inlet and the air outlet are separate elements that are fastened to the top and bottom plates.

2. The battery pack apparatus of claim 1, wherein the top plate has a plurality of openings, the plurality of generally flat battery cells each have a positive terminal tab that extends through a respective one of the plurality of openings in the top plate.

3. The battery pack apparatus of claim 2, wherein each of the plurality of generally flat battery cells have a negative terminal tab that extends through a respective one of the plurality of openings in the top plate.

4. The battery pack apparatus of claim 3, wherein the plurality of openings of the top plate include a first row of openings through which a respective positive terminal tab extends and a second row of openings through which a respective negative terminal tab extends.

5. The battery pack apparatus of claim 3, wherein the top plate is configured to electrically connect all of the positive terminal tabs with a main positive stud and to electrically connect all of the negative terminal tabs with a main negative stud.

6. The battery pack apparatus of claim 1, wherein each of the plurality of heat transfer jackets encases a respective pair of the generally flat battery cells.

7. The battery pack apparatus of claim 1, further comprising a first end plate and a second end plate at opposite ends of the battery pack apparatus, portions of the first and second end plates extending upwardly beyond opposite ends of the top plate.

8. The battery pack apparatus of claim 7, further comprising a set of coupling bars that couple to the end plates and that extend through apertures provided in portions of each heat transfer jacket of the plurality of heat transfer jackets.

9. The battery pack apparatus of claim 8, wherein the set of coupling bars are situated between the top plate and the bottom plate.

10. The battery pack apparatus of claim 8, wherein the apertures are rectangular in shape and each coupling bar has a rectangular cross section.

11. The battery pack apparatus of claim 8, wherein the plurality of heat transfer jackets and the plurality of battery cells are sandwiched between the first and second end plates.

12. The battery pack apparatus of claim 7, wherein a portion of the air inlet extends past the first end plate at a first end of the battery pack apparatus and a portion of the air outlet extends past the second end plate that a second end of the battery pack apparatus.

* * * * *